United States Patent
Sugiura et al.

(10) Patent No.: US 7,218,072 B2
(45) Date of Patent: May 15, 2007

(54) MOTOR DRIVING DEVICE, MOTOR TO BE DRIVEN BY THE SAME DEVICE, AND APPARATUS USING THE SAME MOTOR

(75) Inventors: Kenji Sugiura, Moriguchi (JP); Masahiro Yasohara, Amagasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/542,484

(22) PCT Filed: Aug. 27, 2003

(86) PCT No.: PCT/JP03/10835

§ 371 (c)(1),
(2), (4) Date: Jul. 15, 2005

(87) PCT Pub. No.: WO2004/075392

PCT Pub. Date: Sep. 2, 2004

(65) Prior Publication Data

US 2006/0071621 A1 Apr. 6, 2006

(30) Foreign Application Priority Data

Feb. 18, 2003 (JP) .............................. 2003-039333

(51) Int. Cl.
*G05B 11/28* (2006.01)
*H02P 3/02* (2006.01)

(52) U.S. Cl. ........................ 318/599; 318/254; 318/439

(58) Field of Classification Search ...................... None
See application file for complete search history.

(56) References Cited

U.S. PATENT DOCUMENTS 4,002,958 A * 1/1977 Akamatsu ................... 323/271

(Continued)

FOREIGN PATENT DOCUMENTS

JP 2001-86759 A 3/2001

(Continued)

OTHER PUBLICATIONS

International Search Report for PCT/JP03/10835, dated Jan. 28, 2004.

*Primary Examiner*—Lincoln Donovan
*Assistant Examiner*—Robert W. Horn
(74) *Attorney, Agent, or Firm*—RatnerPrestia

(57) ABSTRACT

A motor driving device includes a motor having three-phase driving coils, a power feeder for powering the coils, and a power feeding controller for controlling a power feeding method. The controller controls electrical potentials of the coils in a period of applying a voltage to the coils to be a power-supply voltage potential or the grounding potential by turning on or off transistors in the power feeder during a first feeding period which starts from a motor halt status and ends when the motor is driven at a given speed. During a second feeding period where the motor is driven at a speed over the given speed, the controller controls the potential such that the coils are opened by turning off the transistors or the potential becomes the power-supply voltage potential. This structure allows the motor driving device to drive the motor at a lower noise with less vibrations.

4 Claims, 16 Drawing Sheets

U.S. PATENT DOCUMENTS

| | | | |
|---|---|---|---|
| 4,212,056 A * | 7/1980 | Kitamura et al. | 363/96 |
| 4,492,903 A * | 1/1985 | Knight et al. | 318/254 |
| 5,463,300 A * | 10/1995 | Oximberg | 318/801 |
| 5,486,743 A * | 1/1996 | Nagai | 318/439 |
| 5,742,139 A * | 4/1998 | Kolomeitsev | 318/254 |
| 6,002,226 A * | 12/1999 | Collier-Hallman et al. | 318/439 |
| 6,049,181 A * | 4/2000 | Kolomeitsev | 318/254 |
| 6,104,152 A * | 8/2000 | Coles et al. | 318/254 |
| 6,121,736 A * | 9/2000 | Narazaki et al. | 318/254 |
| 6,124,688 A * | 9/2000 | Coles et al. | 318/254 |
| 6,215,266 B1 * | 4/2001 | Goh et al. | 318/439 |
| 6,232,730 B1 * | 5/2001 | Doyama et al. | 318/254 |
| 6,388,405 B2 * | 5/2002 | Laurent | 318/254 |
| 6,400,107 B1 * | 6/2002 | Nakatani et al. | 318/254 |
| 6,448,724 B1 * | 9/2002 | Kleinau et al. | 318/254 |
| 6,504,334 B2 * | 1/2003 | Sogawa | 318/599 |
| 6,580,235 B2 * | 6/2003 | Laurent | 318/254 |
| 6,630,764 B1 * | 10/2003 | Dube et al. | 310/177 |
| 6,710,572 B2 * | 3/2004 | Okubo | 318/727 |
| 6,724,166 B2 * | 4/2004 | Narumi et al. | 318/439 |
| 6,777,897 B2 * | 8/2004 | Murai | 318/138 |
| 6,806,663 B2 * | 10/2004 | Kusaka et al. | 318/254 |
| 6,812,667 B2 * | 11/2004 | Yasohara et al. | 318/599 |
| 6,873,125 B2 * | 3/2005 | Seima et al. | 318/254 |
| 2002/0190674 A1 | 12/2002 | Yasohara et al. | |
| 2004/0012353 A1 * | 1/2004 | Seima et al. | 318/432 |
| 2005/0036228 A1 * | 2/2005 | Kimura et al. | 360/73.03 |
| 2006/0071621 A1 * | 4/2006 | Sugiura et al. | 318/254 |

FOREIGN PATENT DOCUMENTS

| | | |
|---|---|---|
| JP | 2002-027777 A | 1/2002 |

* cited by examiner

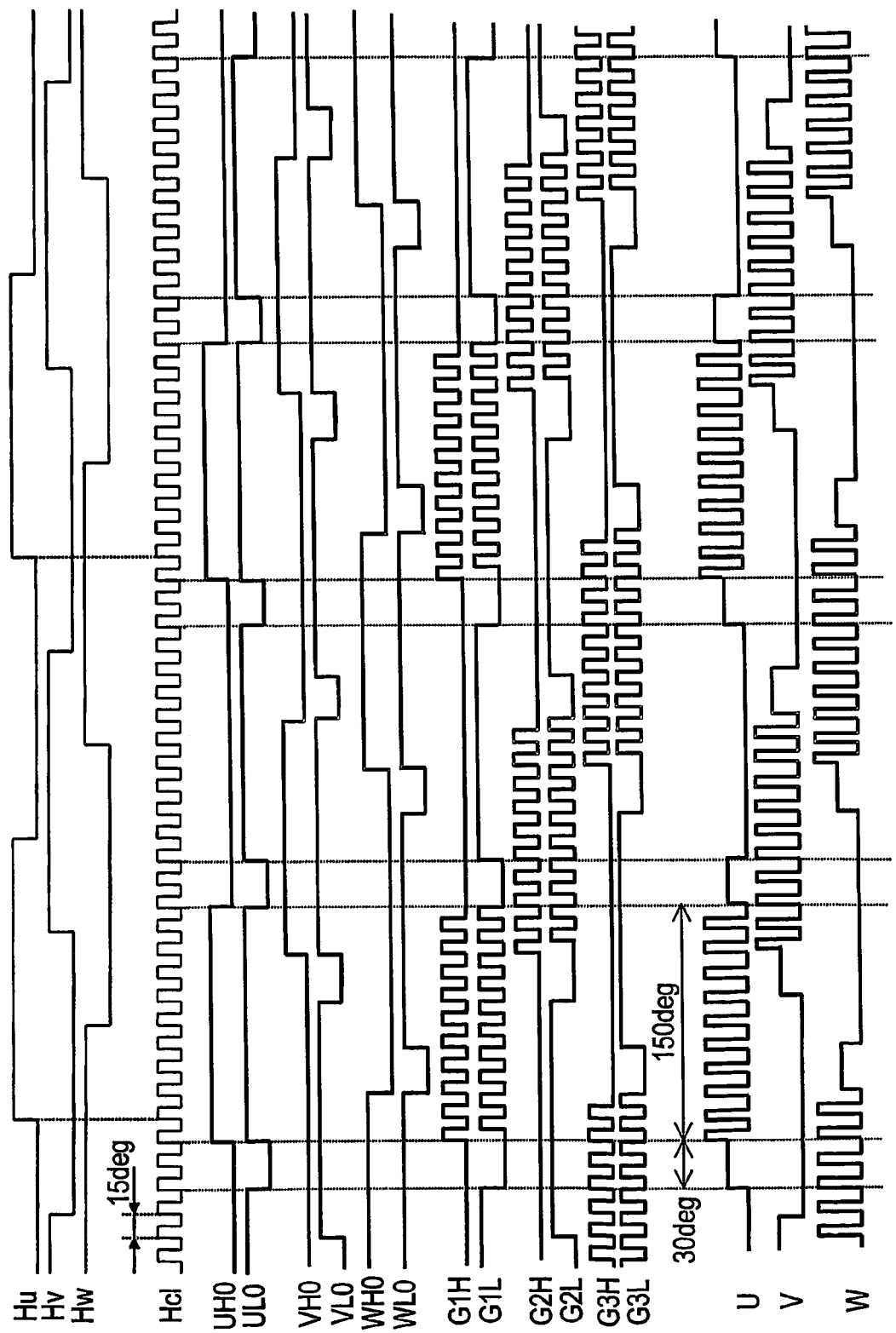

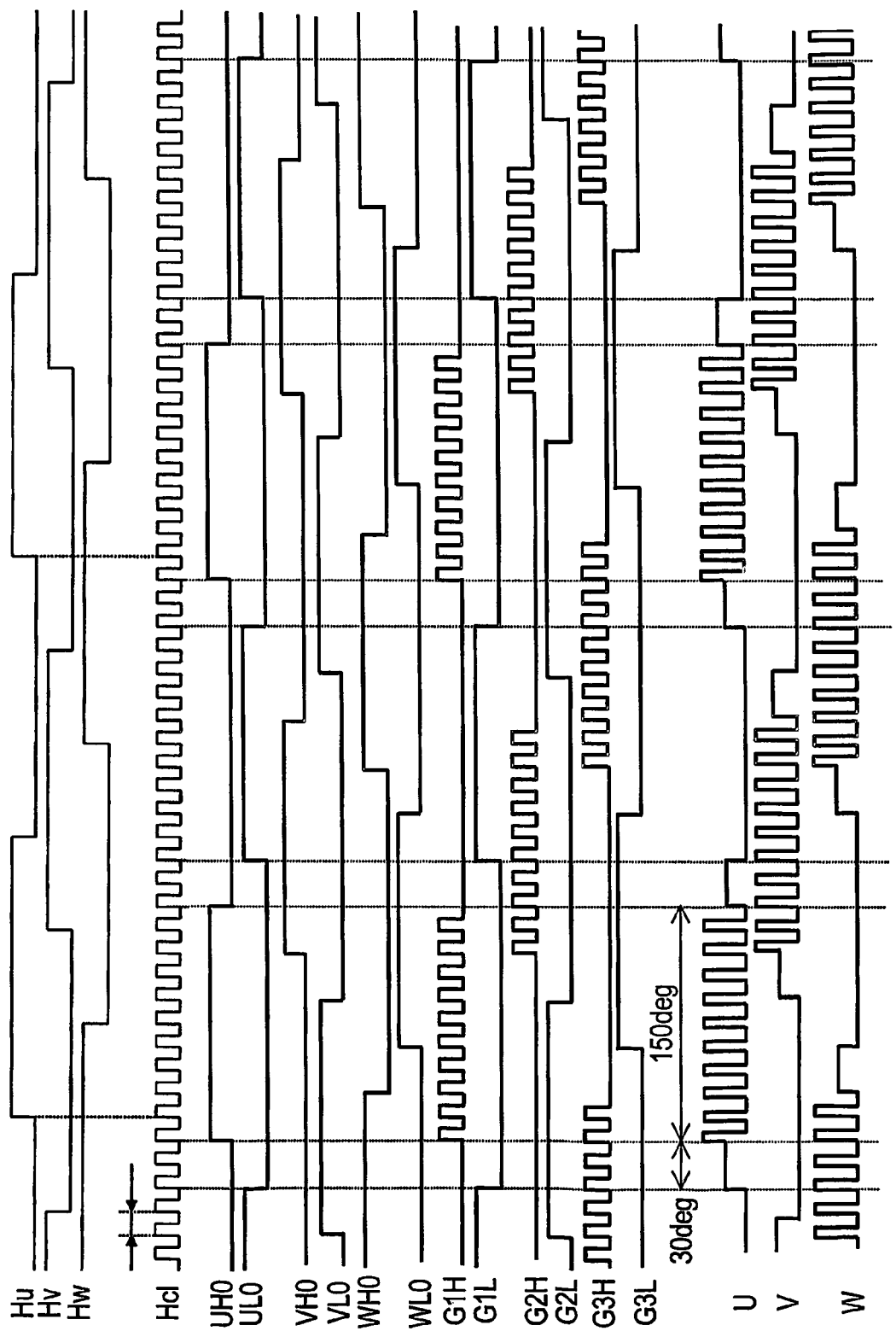

303

304

MOTOR DRIVING DEVICE, MOTOR TO BE DRIVEN BY THE SAME DEVICE, AND APPARATUS USING THE SAME MOTOR

This application is a U.S. National Phase application of PCT International Application PCT/JP2003/010835.

1. Technical Field

The present invention relates to a motor driving device suitable for driving a motor, which is employed in e.g., an information apparatus such as a copying machine, printer, optical medium apparatus, and hard disc apparatus, or an appliance such as an air-conditioner, air cleaner, hot-water supply. The present invention also relates to a motor to be driven by the foregoing motor driving device, and relates to an apparatus using the foregoing motor.

2. Background Art

A brushless DC motor is widely used as a driving motor of an air conditioner and an information apparatus because of its advantages such as a long service life, high reliability, and simplicity of speed control. FIG. 17 is a circuit diagram of a conventional motor driving device, and FIG. 18 shows signal waveforms at respective sections of the circuit shown in FIG. 17 with respect to motor rotating angles (electrical angle).

As shown in FIG. 17, the motor driving device detects a rotor position with a plurality of position detectors 901, 903 and 905 which are formed of Hall elements. Three-phase distributor 890 receives position signals Hu, Hv and Hw from the position detectors, and outputs three-phase distributing signals UH0, UL0, VH0, VL0, WH0 and WL0 to PWM modulator (pulse width modulator) 840. Speed setter 860 outputs speed-setting signal S to a first input terminal of comparator 850. Triangular wave oscillator 847 outputs carrier signal CY to a second input terminal of comparator 850, which compares signal S with signal CY for outputting a signal, which has a pulse width responsive to signal S, into PWM modulator 840. Then PWM modulator 840 modulates signals UH0, UL0, VH0, VL0, WH0 and WL0 into signals having a pulse width in response to signal S, and supplies the modulated signals to gate driver 830. Power feeder 820 receives the signals supplied from gate driver 830 and controls six transistors forming power feeder 820 to switch on or off sequentially.

Power feeding to three-phase coils 811, 813 and 815 disposed to a stator is thus sequentially switched responsive to a rotor position, such as signals U, V, W shown in FIG. 18, thereby rotating the motor.

In the case of the foregoing conventional circuit, the circuit function must be retained in the following manner at starting the motor: Output terminals s1h, s2h and s3h of buffers 831, 833 and 835 in the gate driver should be at the same potential as the grounding at given intervals, so that the circuit function is kept retaining to supply signals from respective output terminals g1h, g2h and g3h of buffers 831, 833 and 835. Because, buffers 831, 832, 833, 834, 835 and 836 receive signals G1H, G1L, G2H, G2L, G3H, and G3L respectively, and should supply a voltage substantially enough to operate transistors 821, 822, 823, 824, 825, and 826 to respective output terminals g1h, g1L, g2h, g2L, g3h, and g3L.

Among those output terminals, outputs from terminals g1L, g2L, and g3L could turn on transistors 822, 824 and 826 if the outputs have substantial differences in voltage from the grounding, because the source terminals of transistors 822, 824 and 826 are coupled to the grounding. However, the outputs from terminals g1h, g2h and g3h must have substantial voltage differences from terminals s1h, s2h, and s3h instead of voltage differences from the grounding. Since terminals s1h, s2h, and s3h coupled to the source terminals of transistors 821, 823 and 825 are also coupled to driving coils 811, 813 and 815 respectively, the voltages of terminals s1h, s2h and s3h vary in response to ON-OFF of transistors 821, 822, 823, 824, 825 and 826. In this case, when transistors 821, 823 and 825 are turned on, the voltages of terminals s1h, s2h and s3h become equal to power-supply voltage Vd. If a voltage higher than Vd is not supplied from the outside, it is necessary to produce the voltage higher than Vd. For this purpose, capacitors (not shown) are coupled to respective terminals s1h, s2h and s3h, and when those terminals become equal to the grounding in electrical potential, the respective capacitors are charged to have enough voltages for operating transistors 821, 823 and 825 next time. Buffer 831 then outputs an add-voltage of the charged voltage and the voltage at terminal s1h to terminal g1h. Buffer 833 then outputs an add voltage of the charged voltage and the voltage at terminal s2h to terminal g2h. Buffer 833 then outputs an add voltage of the charged voltage and the voltage at terminal s3h to terminal g3h. As such, terminals s1h, s2h and s3h must be equal to the grounding in electrical potential at the given intervals in order to charge the respective capacitors. If the capacitors are not charged enough, transistors 821, 823 and 825 cannot be turned on, and as a result, three-phase coils 811, 813 and 815 are not normally fed with power, so that the motor cannot rotate.

The circuit operates specifically in the following manner: When transistors 821, 823 and 825 prepared in power feeder 820 stay in turned-off status, transistors 822, 824 and 826 are turned on, thereby terminals s1h, s2h and s3h are forcibly become the grounding potential. However, in this operation, since driving coils 811, 813 and 815 are coupled to each other via transistors 822, 824 and 826, the motor is in brake status. This brake status is not troublesome in regular driving, however, in the case of reducing a speed of the motor, the speed is quickly reduced because of the brake-status, thereby producing large vibrations which cause noises.

Another conventional motor driving device is disclosed in Japanese Patent Application Non-Examined Publication No. 2002-27777. This motor driving device controls torque of the motor in the following manner: A method of reducing vibrations and noises of a motor is disclosed. When a target speed. of the motor is changed, a width of torque compensating amount of a torque pattern is temporarily narrowed than a given value, and after the target speed. is achieved and a given time passes, the torque compensating amount is restored to the given value.

The foregoing conventional motor driving device can reduce vibrations and noises of the motor during the operation by the method discussed above. However, this method needs a complicated circuit for narrowing the width of torque compensating amount of the torque pattern than the given value and restoring it to the given value after the target speed. is achieved and the given time passes. This method also involves a complicated control.

When the motor is reduced its speed, the vibration may resonate with an apparatus which employs the motor, or the vibrations of the motor travel to the apparatus and cause the apparatus to vibrate, so that the operation may prevent the performance and quality of the overall apparatus from improving.

DISCLOSURE OF THE INVENTION

The present invention addresses the problem discussed above and aims to provide a simply structured motor driving device that can suppress vibrations and noises generated while a motor is driven.

The motor driving device of the present invention comprises the following elements:

(a) a motor including three-phase driving coils;

(b) a power feeder for feeding power to the driving coils; and (c) a power feeding controller for controlling a power feeding method applied to the driving coils by the power feeder, and including the following steps of controlling:

during a first feeding period, i.e., starting from a motor halt status and ending when the motor is driven by a given speed, electrical potentials of the respective coils while a voltage is applied to the driving coils are controlled to be a potential either one of a power-supply voltage potential or the grounding potential by turning on or off the transistors disposed in the power feeder, and during a second feeding period, i.e., while the motor is driven at a speed. over the given value, the electrical potentials of the respective coils while a voltage is applied to the driving coils are controlled to be the potential of the power-supply voltage potential, or the driving coils are opened by turning off the transistors disposed in the power feeder.

This structure allows reducing substantially vibrations and noises of the motor in operation.

BRIEF DESCRIPTION OF THE DRAWINGS

FIG. 9A and FIG. 9B illustrate an operation of the motor driving device shown in FIG. 8.

PREFERRED EMBODIMENTS OF THE INVENTION

Exemplary embodiments of the present invention are demonstrated hereinafter with reference to the accompanying drawings.

Exemplary Embodiment 1

Figure 1:
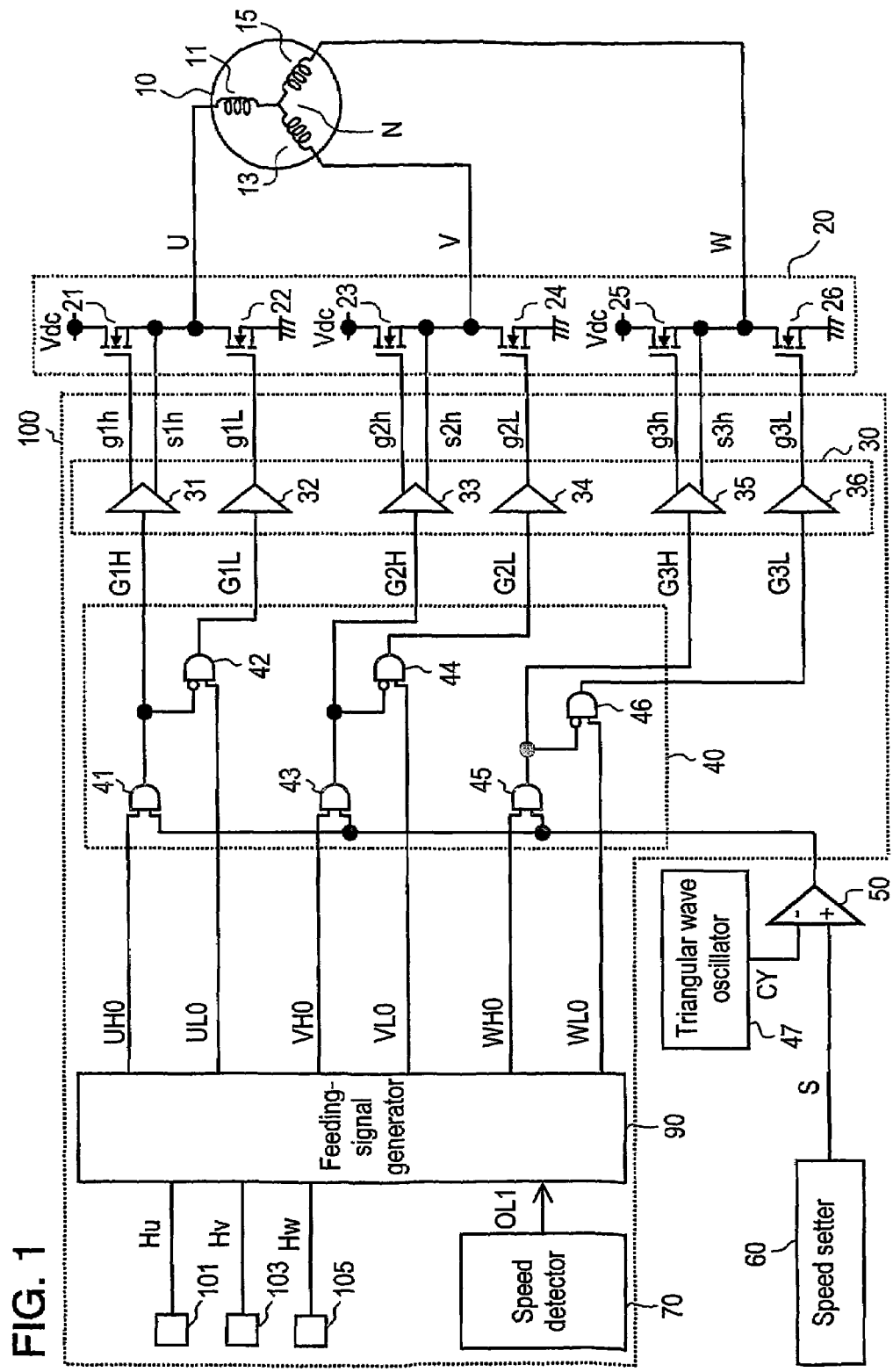
FIG. 1 shows a circuit diagram of a motor driving device in accordance with a first exemplary embodiment of the present invention.
Figure 2:
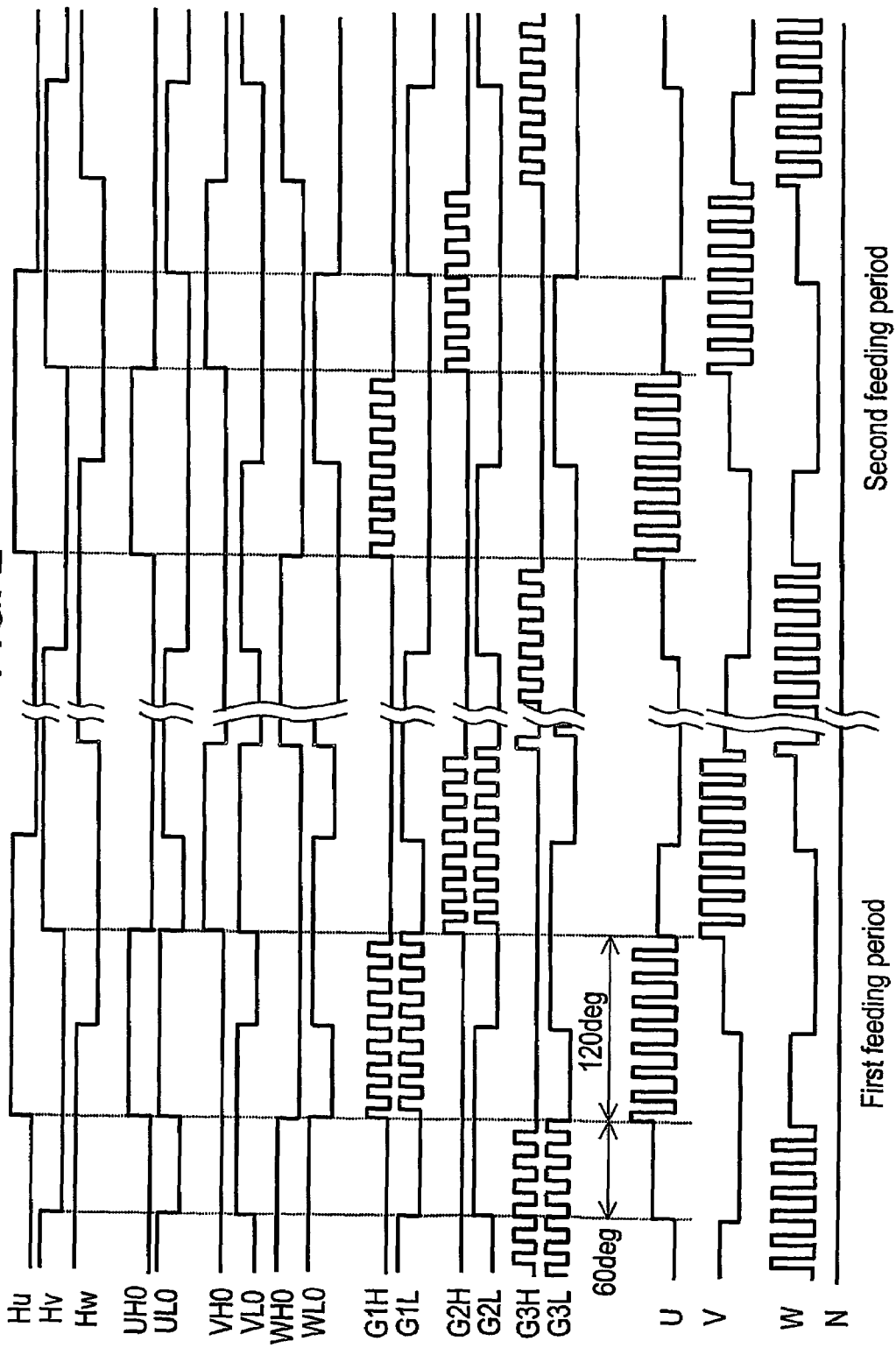
FIG. 2 illustrates an operation of the motor driving device shown in FIG. 1

FIG. 1 shows a circuit diagram of a motor driving device in accordance with the first exemplary embodiment of the present invention, and FIG. 2 illustrates an operation of the motor driving device shown in FIG. 1.

In this embodiment, the following case is demonstrated: during the first and second feeding periods, three-phase driving coils are fed power by rectangular-shaped feeding waveforms having 120 degrees in electrical angles.

In FIG. 1, motor 10 includes three-phase driving coils, namely, phase-U coil 11, phase-V coil 13 and phase-W coil 15, and those coils are connected to power feeder 20 in the following manner. Feeder 20 forms an upper arm with three field-effect transistors (FET) 21, 23 and 25, and forms a lower arm with FET 22, 24 and 26. A first terminal of phase-U coil 11 is connected to a junction of FETs 21 and 22. A first terminal of phase-V coil 13 is connected to a junction of FETs 23 and 24. A first terminal of phase-W coil 15 is connected to a junction of FETs 25 and 26. Respective second terminals of the three-phase coils are connected to each other, thereby forming neutral point N.

A positive feeding terminal of a dc power supply (not shown, and power-supply voltage is Vdc) is coupled to the transistors forming the upper arm of feeder 20 respectively, and a negative feeding terminal of dc power supply (not shown) is coupled to the grounding. The transistors forming the lower arm of the feeder 20 are also coupled to the grounding. This circuit structure allows the dc power supply to power the three-phase driving coils through a group of the transistors forming the upper arm and another group of the transistors forming the lower arm of feeder 20.

Position detectors 101, 103 and 105 are formed of Hall elements or Hall ICs, and detect a position of a mover with respect to each phase coil 11, 13 and 15. (The mover is not shown. It is an element of a linear type motor and corresponds to a rotor of a rotating motor, hereinafter "rotor" is used instead of "mover".) Feeding-signal generator 90 receives position detecting signals Hu, Hv and Hw from detectors 101, 103 and 105, and outputs signals UH0, UL0, VH0, VL0, WH0 and WL0, as shown in FIG. 2, to PWM modulator 40. When these signals stay on level "H", transistors 21, 22, 23, 24, 25 and 26, constituting feeder 20, are turned ON, and on the contrary, when these signals stay on level "L", those transistors are turned OFF. Signals UH0, VH0 and WH0 have a phase difference of 120 degrees in electrical angles from each other. Signals UL0, VL0 and WL0 also have a phase difference of 120 degrees in electrical angles from each other.

Feeding-signal generator 90 is further connected with speed-detector 70, so that generator 90 outputs a first feeding waveform shown on the left side in FIG. 2 during a first feeding period, i.e., from a motor halt status to the given speed status and outputs a second feeding waveform shown on the right side in FIG. 2 during the second feeding period, i.e., while the motor is driven at a speed over the given speed based on feeding-period detecting signal OL1 supplied from detector 70.

PWM modulator 40 has AND gates 41, 43 and 45. PWM modulator 40 also has AND gates 42, 44 and 46 of one-sided inverter input. Respective first input terminals of gates 41, 43 and 45 receive signals UH0, VH0 and WH0. Respective second input terminals of gates 41, 43 and 45 are commonly connected with each other and also coupled to an output terminal of comparator 50. Respective first input terminals of gates 42, 44 and 46 receive signals UL0, VL0 and WL0. Respective second input terminals of gates 42, 44 and 46, i.e., inverter input terminals, are coupled to an output terminal of gates 41, 43 and 45 respectively. Comparator 50 compares speed-instruction signal S in voltages with triangular wave signal CY supplied from triangular wave oscillator 47. Meanwhile triangular wave signal CY is a carrier signal in the pulse width modulation, and its frequency ranges from several kHz to several hundreds kHz, which is rather higher range than that of signal S.

Gate driver 30 has buffers 31, 32, 33, 34, 35 and 36. Buffers 31, 33 and 35 receive output signals G1H, G2H and G3H from gates 41, 43 and 45 respectively. Buffers 32, 34 and 36 receive signals G1L, G2L and G3L from gates 42, 44 and 46 respectively.

Buffers 31, 32, 33, 34, 35 and 36 output signals g1h, g1L, g2h, g2L, g3h and g3L from the output terminals to respective gates of transistors 21, 22, 23, 24, 25 and 26.

Respective another output terminals of buffers 31, 33 and 35 (output signals s1h, s2h and s3h) are coupled to a junction point of transistors 21 and 22, a junction point of transistors 23 and 24, and a junction point of transistors 25 and 26.

Power-feeding controller 100, which controls a method of power-feeding done by feeder 20 to three-phase driving coils 11, 13 and 15, includes position detectors 101, 103 and 105, speed-detector 70, feeding-signal generator 90, PWM modulator 40 and gate driver 30.

An operation of the foregoing motor driving device in accordance with the first embodiment is demonstrated with reference to FIG. 2, which illustrates an operation of feeding controller 100. Position detecting signals Hu, Hv and Hw have a phase difference in 120 degrees in electrical angles from each other as shown in the timing chart of FIG. 2.

Feeding signal generator 90 generates feeding waveform signals UH0, UL0, VH0, VL0, WH0 and WL0 by using signals Hu, Hv and Hw based on the timing chart shown in FIG. 2. Those signals UH0, UL0, VH0, VL0, WH0 and WL0 are supplied to power-feeder 20 via PWM modulator 40 and gate driver 30, thereby driving motor 10. While motor 10 is driven, during the first feeding period, starting from the motor halt status and ending until the motor is driven at the given speed, feeding controller 100 controls such that the three-phase driving coils' terminals U, V, and W are fed in a feeding cycle of 120 degrees in electrical angles as shown in the left side of FIG. 2.

In this case, signals G1H, G1L, G2H, G2L, G3H, G3L are supplied to corresponding transistors 21, 22, 23, 24, 25 and 26 via corresponding buffers 31, 32, 33, 34, 35, 36. During the feeding period of 120 degrees, transistors 21, 23, 25 are turned on or off and transistors 22, 24, 26 are turned off or on. Terminals U, V, W of respective driving coils are controlled such that their potentials become either one of the power-supply voltage potential or the grounding potential.

To be more specific, when signal G1H stays on level "H", signal "g1h" which is formed by having signal G1H undergo buffer 31 also turns to level "H". At this time, signal G1L stays on level "L" and signal "g1L" which is formed by having signal G1L undergo buffer 32 also turns to level "L". In this status, transistor 21 is turned on and transistor 22 is turned off, so that terminal U of driving coil has a potential substantially equal to power-supply voltage Vdc. In actual, driving-coil terminal U has a potential of power-supply voltage Vdc minus a voltage drop corresponding to an amount of on-voltage between the source and the drain of transistor 21. This on-voltage between source and drain is negligibly small with respect to power-supply voltage Vdc. The foregoing operation can be also applied to driving-coil terminals V and W. Therefore, in the claim discussed later, the following expression is used: "electrical potentials of respective coils are set equal to the power-supply voltage potential."

On the contrary, when signal G1H stays on level "L", signal "g1h" which is formed by having signal G1H undergo buffer 31 also turns to level "L". At this moment, signal G1L stays on level "H", and signal g1L which is formed by having signal G1L undergo buffer 32 also turns to level "H". In this status, transistor 21 is turned off and transistor 22 is turned on, so that driving-coil terminal U has a potential substantially equal to the grounding potential. In actual, driving-coil terminal U has a potential of power-supply voltage Vdc plus an amount of on-voltage between the source and the drain of transistor 22. This on-voltage between source and drain is negligibly small with respect to power-supply voltage Vdc. The foregoing operation can be also applied to driving-coil terminals V and W. Therefore, in the claim discussed later, the following expression is used: "electrical potentials of respective coil terminals are set equal to the grounding potential."

In a similar manner, when signal G2H stays on level "H", signal "g2h" which is formed by having signal G2H undergo buffer 33 also turns to level "H". At this time, signal G2L stays on level "L" and signal "g2L" which is formed by having signal G2L undergo buffer 34 also turns to level "L". In this status, transistor 23 is turned on and transistor 24 is turned off, so that terminal V of driving coil has a potential substantially equal to the potential of power-supply voltage Vdc. On the contrary, when signal G2H stays on level "L", signal "g2h" which is formed by having signal G2H undergo buffer 33 also turns to level "L". At this moment, signal G2L stays on level "H", and signal g2L which is formed by having signal G2L undergo buffer 34 also turns to level "H". In this status, transistor 23 is turned off and transistor 24 is turned on, so that driving-coil terminal V has a potential substantially equal to the grounding potential.

In a similar manner, when signal G3H stays on level "H", signal "g3h" which is formed by having signal G3H undergo buffer 35 also turns to level "H". At this time, signal G3L stays on level "L" and signal "g3L" which is formed by having signal G3L undergo buffer 36 also turns to level "L". In this status, transistor 25 is turned on and transistor 26 is turned off, so that terminal W of driving coil has a potential substantially equal to the potential of power-supply voltage Vdc. On the contrary, when signal G3H stays on level "L", signal "g3h" which is formed by having signal G3H undergo buffer 35 also turns to level "L". At this moment, signal G3L stays on level "H", and signal g3L which is formed by having signal G3L undergo buffer 36 also turns to level "H". In this status, transistor 25 is turned off and transistor 26 is turned on, so that driving-coil terminal W has a potential substantially equal to the grounding potential.

To be more specific, terminals s1h, s2h and s3h are coupled with a first terminal of respective capacitors (not shown). A second terminal of respective capacitors is coupled to the grounding via a series circuit (not shown) formed of a resistor and another dc power supply than dc power-supply Vdc. This circuit forms a capacitor charging circuit for charging respective capacitors. When terminals s1h, s2h or s3h becomes equal to the grounding potential, this charging circuit charges respective capacitors with potentials enough to operate transistors 21, 23, or 25. Then when signal G1H, G2H or G3H turns to level "H", a charging voltage is applied between terminals g1h and s1h, terminals g2h and s2h, or terminals g3h and s3h, thereby turning on transistors 21, 23 or 25.

As discussed above, while outputs from buffers 31, 33 and 35 keep changing level "H" and level "L", buffers 32, 34 and 36 keep outputting level "L" and level "H" alternately in sequence corresponding to the outputs from buffers 31, 33 and 35. Transistors 22, 24 and 26 are thus turned on at regular intervals, so that terminals s1h, s2h and s3h become the grounding potential regularly. As a result, the function of buffers is kept retaining.

Next, during the second feeding period, i.e., the motor is driven at a speed over the given speed, feeding controller 100 controls power-feeding to three-phase driving-coil terminals U, V and W of motor 10 as shown in the right side of FIG. 2. Signals G1H, G1L, G2H, G2L, G3H, G3L are supplied to corresponding transistors 21, 22, 23, 24, 25 and 26 via corresponding buffers 31, 32, 33, 34, 35, 36. During the feeding period of 120 degrees in electrical angles, transistors 21, 23, 25 are turned on or off and transistors 22, 24, 26 are turned off. Terminals U, V, W of respective driving coils are controlled such that their potentials become either one of the power-supply voltage potential or the terminals are opened.

To be more specific, when signal G1H stays on level "H", signal "g1h" which is formed by having signal G1H undergo buffer 31 also turns to level "H". At this time, signal G1L stays on level "L" and signal "g1L" which is formed by having signal G1L undergo buffer 32 also turns to level "L". In this status, transistor 21 is turned on and transistor 22 is turned off, so that terminal U of driving coil has a potential substantially equal to the potential of power-supply voltage Vdc. On the other hand, when signal G1H stays on level "L", signal "g1h" which is formed by having signal G1H undergo buffer 31 also turns to level "L". At this moment, signal G1L keeps staying on level "L", and signal g1L which is formed by having signal G1L undergo buffer 32 also keeps staying on level "L". In this status, transistors 21 and 22 are turned off, so that driving-coil terminal U is opened.

In a similar manner, when signal G2H stays on level "H", signal "g2h" which is formed by having signal G2H undergo buffer 33 also turns to level "H". At this time, signal G2L stays on level "L" and signal "g2L" which is formed by having signal G2L undergo buffer 34 also turns to level "L". In this status, transistor 23 is turned on and transistor 24 is turned off, so that terminal V of driving coil has a potential substantially equal to the potential of power-supply voltage Vdc. On the other hand, when signal G2H stays on level "L", signal "g2h" which is formed by having signal G2H undergo buffer 33 also turns to level "L". At this moment, signal G2L keeps staying on level "L", and signal g2L which is formed by having signal G2L undergo buffer 34 also keeps staying on level "H". In this status, transistors 23 and 24 are turned off, so that driving-coil terminal V is opened.

In a similar manner, when signal G3H stays on level "H", signal "g3h" which is formed by having signal G3H undergo buffer 35 also turns to level "H". At this time, signal G3L stays on level "L" and signal "g3L" which is formed by having signal G3L undergo buffer 36 also turns to level "L". In this status, transistor 25 is turned on and transistor 26 is turned off, so that terminal W of driving coil has a potential substantially equal to the potential of power-supply voltage Vdc. On the other hand, when signal G3H stays on level "L", signal "g3h" which is formed by having signal G3H undergo buffer 35 also turns to level "L". At this moment, signal G3L keeps staying on level "L", and signal g3L which is formed by having signal G3L undergo buffer 36 also keeps staying on level "L". In this status, transistors 25 and 26 are turned off, so that driving-coil terminal W is opened.

In FIG. 2, x-axis represents electrical angles, so that a feeding period of 120 degrees in the first feeding period is equal to that in the second feeding period; however, the second feeding period has a higher speed than in the first feeding period. The feeding period in the second period is thus shorter than that in the first period timewise. Therefore, in the second feeding period, transistors 22, 24, and 26 are turned on regularly at short intervals with on-signals G1L, G2L and G3L at shorter intervals as shown in the right side of FIG. 2 than the first feeding period. Then the capacitors (not shown) coupled to terminals s1h, s2h and s3h respectively are charged regularly at short intervals, so that the capacitors do not ever discharge but retain a necessary voltage. Thus buffer 31 outputs the charging voltage plus a voltage at terminal s1h from terminal g1h when transistors 21, 23 and 25 are turned on next time. In a similar way, buffer 33 outputs the charging voltage plus a voltage at terminal s2h from terminal g2h, and buffer 35 outputs the charging voltage plus a voltage at terminal s3h from terminal g3h. Buffers 31, 33, 35 thus keep a voltage enough for a signal voltage of output signals g1h, g2h and g3h, so that they can maintain the functions of buffer.

It is not needed to have terminals s1h, s2h and s3h be equal compulsorily to the grounding potential as a conventional device did. In other words, when transistors 21, 23 and 25 are turned off, current supply from those transistors is stopped; however, the current running through the coils wants to keep running because of the characteristics of the coil. This current-running causes diodes (not shown), which are coupled in parallel with transistors 22, 24, 26 and coupled to the grounding at their anodes, to be turned on, thereby passing a current through the driving coils. The turning on of the diodes makes three-phase driving coils U, V and W have the grounding potential, so that terminals s1h, s2h and s3h also have the grounding potential. As a result, the buffers can retain their functions.

Therefore, in the second feeding period, even if the motor reduces its speed, the motor does not fall into a brake status and the speed will not decrease rapidly, because three-phase driving coils U, V and W are not coupled to each other via transistors as the conventional device did. As a result, the motor operates advantageously at a lower noise and with less vibrations.

A variety of signal processing done in this first embodiment can be achieved by hardware such as an analog circuit or a digital circuit, or by software using a microprocessor, or a digital signal processor. Not to mention, the signal processing can be also achieved in the form of IC or LSI.

The motor of the present invention is driven by a motor driving device, and the motor driving device in accordance with the first exemplary embodiment discussed above can be used as that motor driving device. Use of the motor driving device allows the motor of the present invention to operate advantageously at a lower noise and with less vibrations. The apparatus of the present invention employs a motor driven by a motor driving device. The motor driving device in accordance with the first embodiment of the present invention can be used as this motor driving device. Use of the motor driving device allows the apparatus of the present invention to operate advantageously at a lower noise and with less vibrations.

Exemplary Embodiment 2

Figure 3:
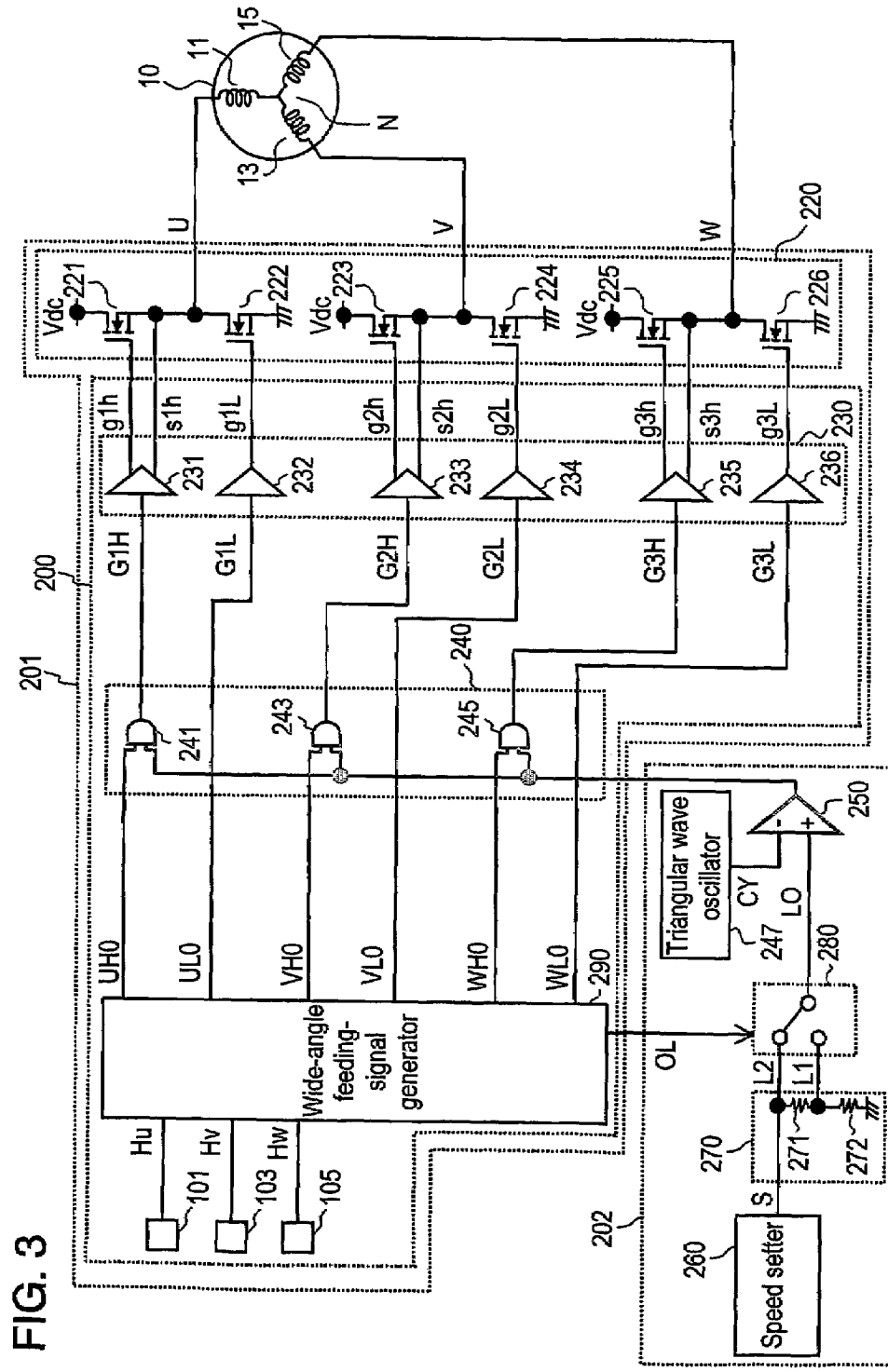
FIG. 3 shows a circuit diagram of a motor driving device including a wide-angle power feeding signal generator.
Figure 4:
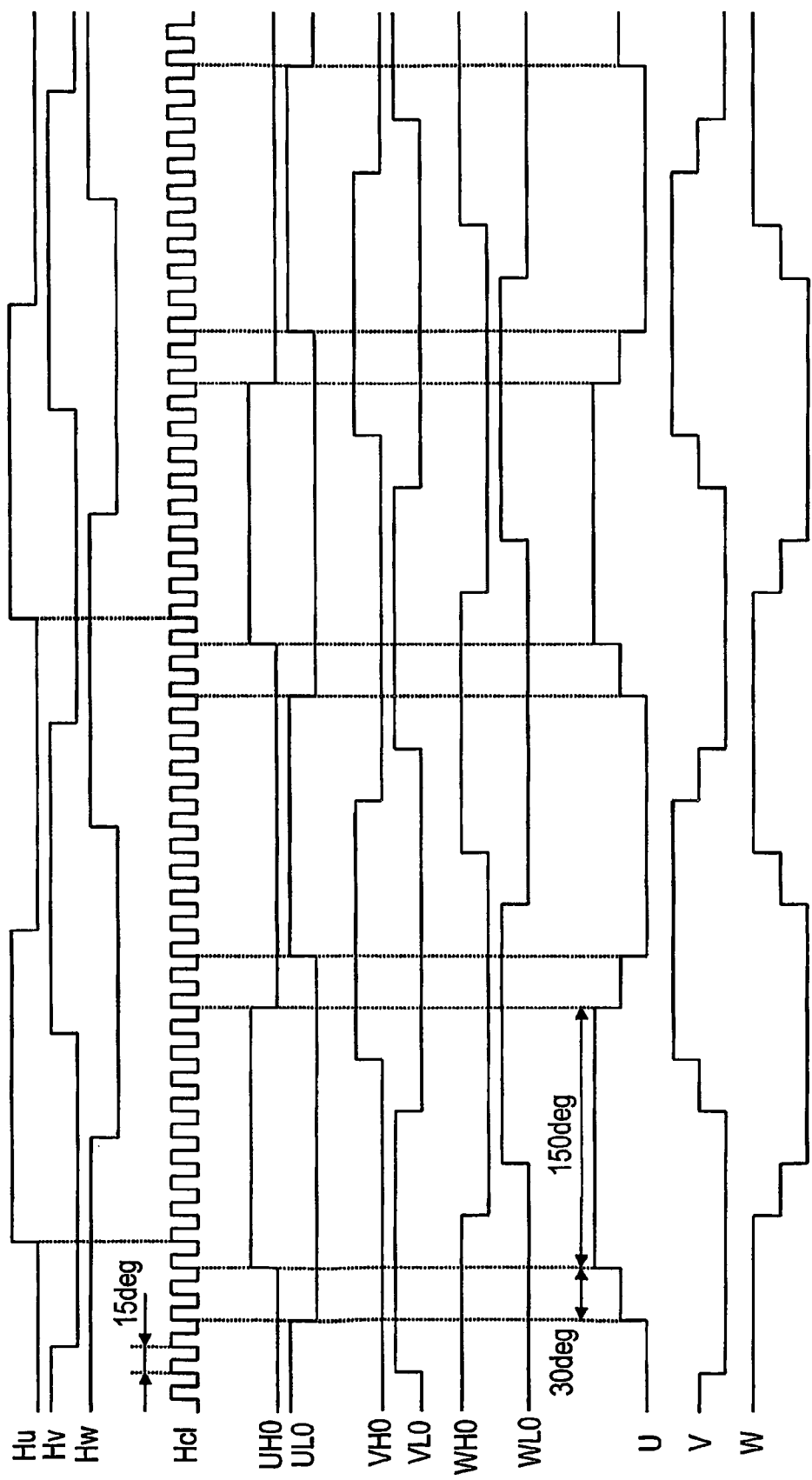
FIG. 4 illustrates an operation of the wide-angle power feeding signal generator in the motor driving device shown in FIG. 3.
Figure 5:
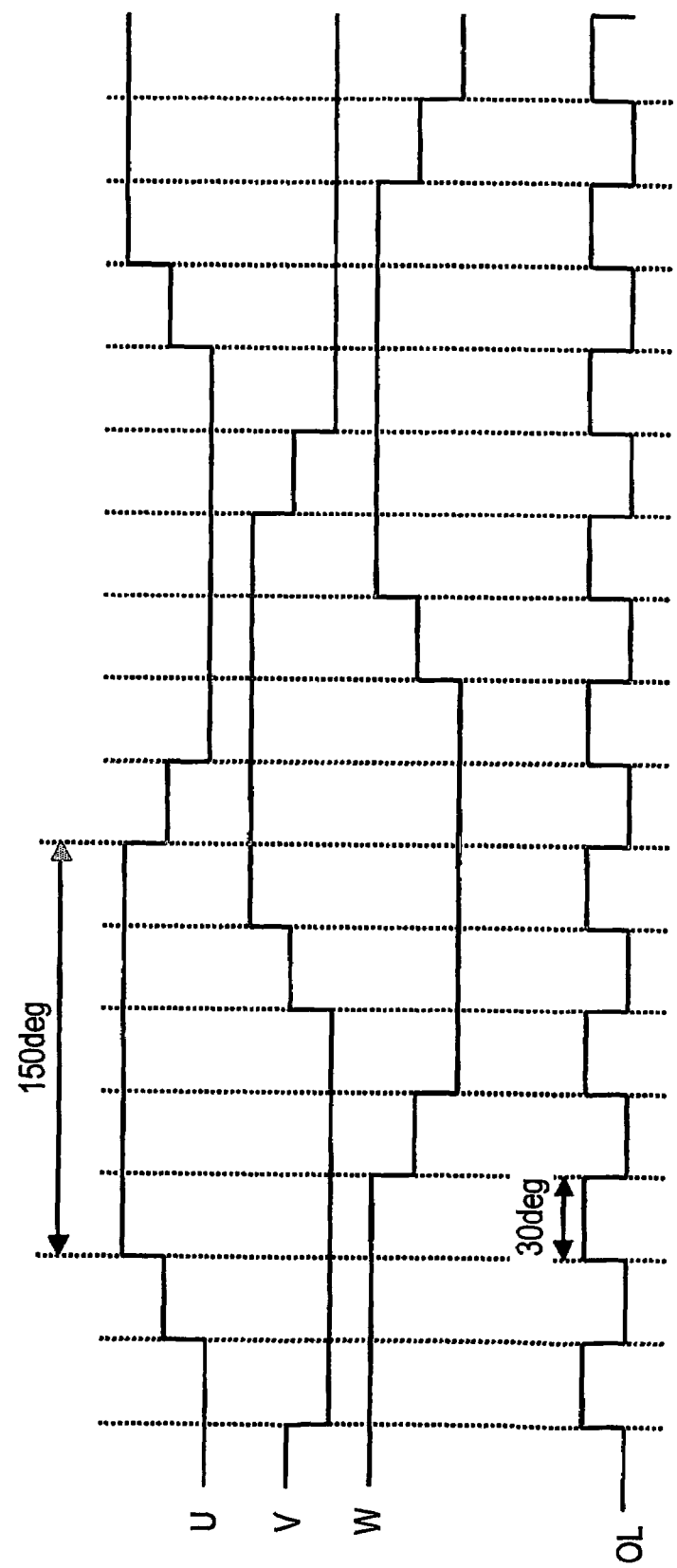
FIG. 5 illustrates how an overlapping period detecting signal OL is output in the motor driving device shown in FIG. 3.
Figure 6:
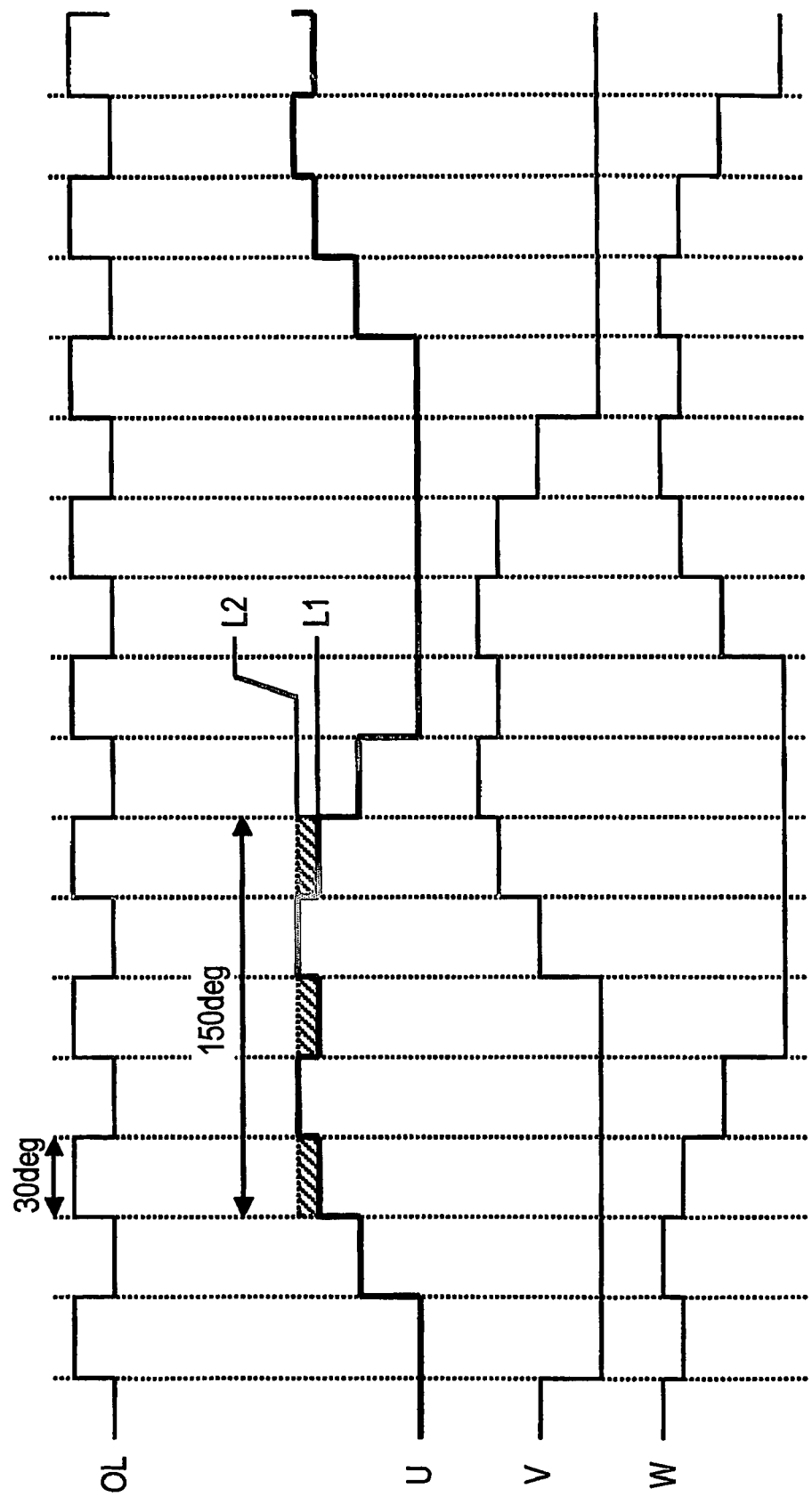
FIG. 6 shows waveforms of feeding respective phase coil terminals in the motor driving device shown in FIG. 3.
Figure 7:
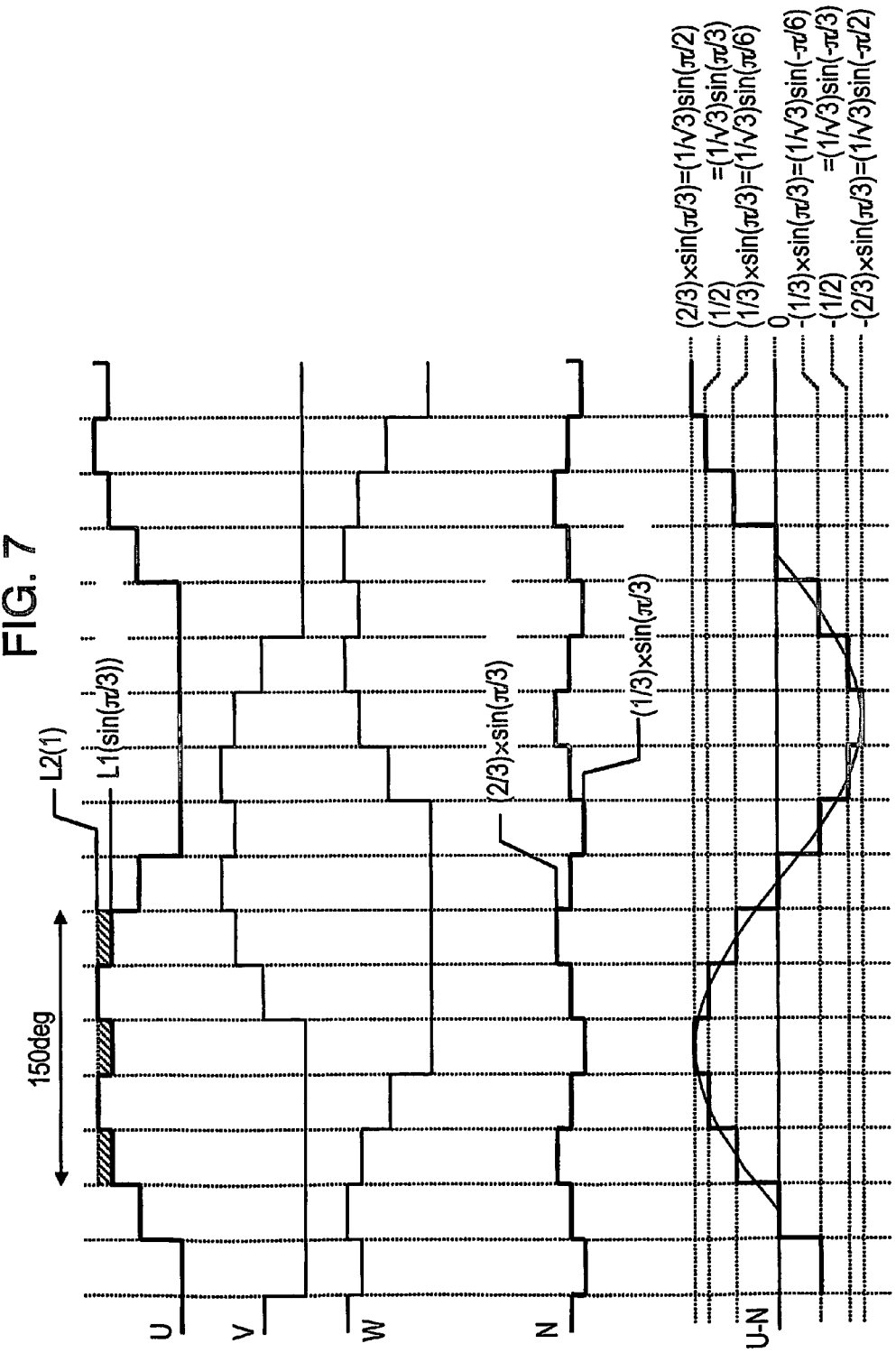
FIG. 7 shows waveforms of feeding respective phase coils in the motor driving device shown in FIG. 3.
Figure 8:
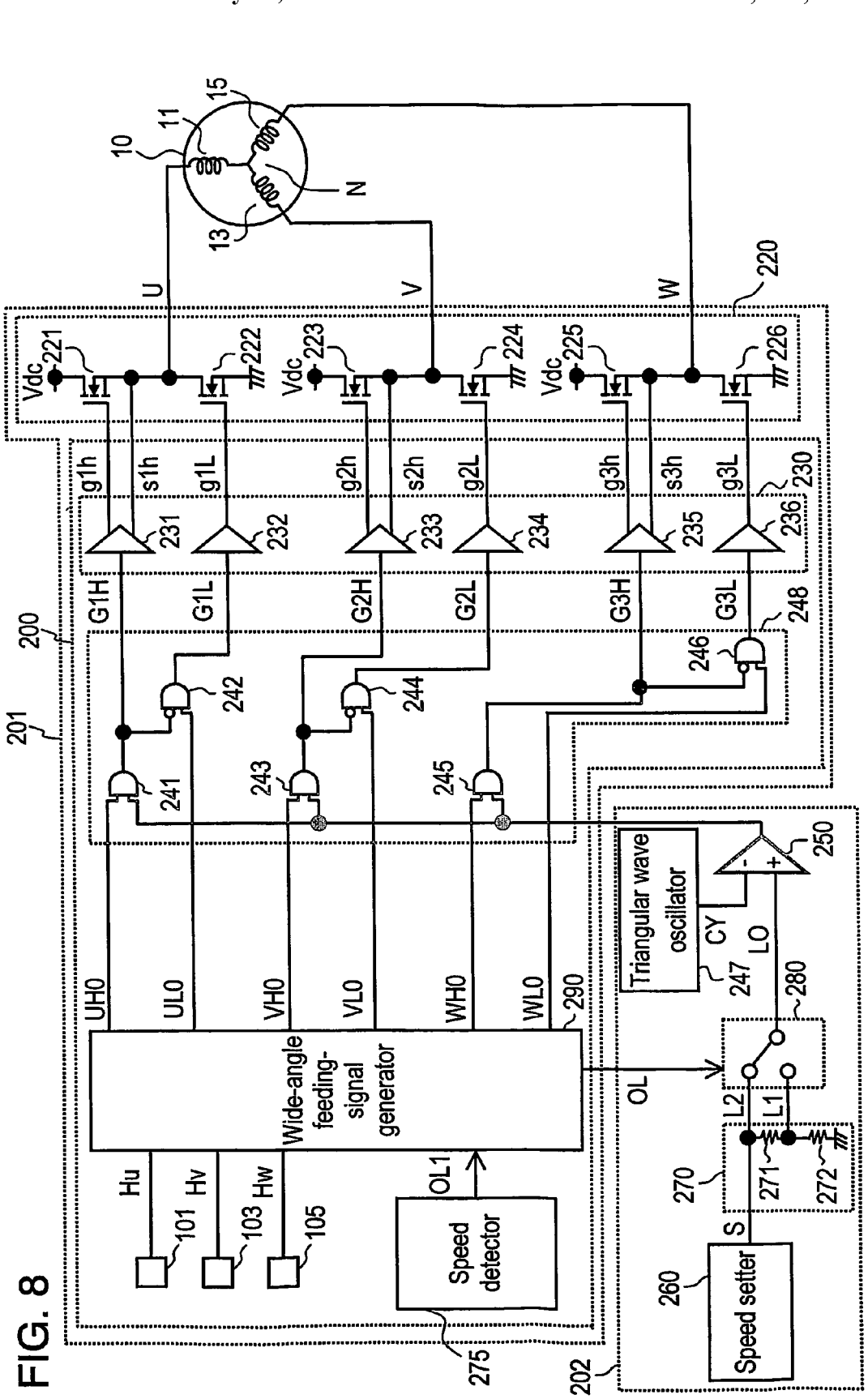
FIG. 8 shows a circuit diagram of a motor driving device in accordance with a second exemplary embodiment of the present invention.

FIG. 3 shows a circuit diagram of a motor driving device including a wide-angle feeding-signal generator. FIG. 4 illustrates an operation of the wide-angle feeding signal generator of the motor driving device shown in FIG. 3. FIG. 5 illustrates how an overlapping period detecting signal OL is output in the motor driving device shown in FIG. 3. FIG. 6 shows waveforms of feeding power to the respective phase-coil terminals in the motor driving device shown in FIG. 3. FIG. 7 shows waveforms of feeding the respective phase-coils in the motor driving device shown in FIG. 3. FIG. 8 shows a circuit diagram of a motor driving device in accordance with the second exemplary embodiment of the present invention. FIGS. 9A and 9B show an operation of the motor driving device shown in FIG. 8.

Before the description of the motor driving device in accordance with the second embodiment, a motor driving device including a wide-angle feeding signal generator is described first. In this description, three-phase driving coils are to be fed by a wide-angle feeding waveform of 150 degrees in electrical angles.

In FIG. 3, three-phase driving coils, namely, phase-U coil 11, phase-V coil 13 and phase-W coil 15, are connected to power feeder 220 in the following manner. Feeder 220 forms an upper arm with three field-effect transistors (FET) 221, 223 and 225, and forms a lower arm with FET 222, 224 and 226. A first terminal of phase-U coil 11 is connected to a junction of FETs 221 and 222. A first terminal of phase-V coil 13 is connected to a junction of FETs 223 and 224. A first terminal of phase-W coil 15 is connected to a junction of FETs 225 and 226. Respective second terminals of the three-phase coils are connected to each other, thereby forming neutral point N.

A dc power supply (not shown) applies its output voltage Vdc to feeder 220, and powers the three-phase coils via feeder 220.

Position detectors 101, 103 and 105 are formed of Hall elements or Hall ICs, and detect a position of a mover with respect to each phase coil 11, 13 and 15. (The mover is not shown. It is an element of a linear type motor and corresponds to a rotor of a rotating motor, hereinafter "rotor" is used instead of "mover".) Wide-angle feeding-signal generator 290 receives position detecting signals Hu, Hv and Hw from detectors 101, 103 and 105, and outputs signals UH0, UL0, VH0, VL0, WH0 and WL0. As shown in FIG. 4, these signals stay on level "H" during 150 degrees in electric angle. When these signals stay on level "H", transistors 221, 222, 223, 224, 225 and 226, constituting feeder 220, are turned ON, and on the contrary, when these signals stay on level "L", those transistors are turned OFF. Signals UH0 and UL0 have a period of level "L" in common for 30 degrees. They are in a supplemental relation to be on level "H" for 150 degrees electrical angle. Signals VH0 and VL0, signals WH0 and WL0 are in the same relation as signals UH0 and UL0. Further, signals UH0, VH0 and WH0 have a phase difference of 120 degrees in electrical angles with each other. Signals UL0, VL0 and WL0 also have a phase difference of 120 degrees with each other.

PWM modulator 240 has AND gates 241, 243 and 245. Respective first input terminals of these gates receive signals UH0, VH0 and WH0. Respective second input terminals of these gates are commonly connected with each other and also coupled to an output terminal of comparator 250, which compares signal L0 in voltages with triangular wave signal CY supplied from triangular wave oscillator 247. Signal L0 is supplied based on speed instruction signal S supplied from speed setter 260. Meanwhile triangular wave signal CY is a carrier signal in the pulse width modulation, and its frequency ranges from several kHz to several hundreds kHz, which is rather higher range than that of signal S or signal L0.

Signal L0 is obtained by selector 280 through selecting one of first value L1 or second value L2, both values being produced based on signal S supplied from speed setter 260. This selection is determined by overlapping period detecting signal OL supplied from wide-angle feeding-signal generator 290.

First value L1 is obtained by dividing signals with level setter 270 formed of resistors 271 and 272. Second value L2 is obtained directly from signal S. The values of resistors 271 and 272 are set such that a ratio of L1 vs. L2 is to be sin(π/3): 1(approx. 0.866: 1).

Gate driver 230 has buffers 231, 232, 233, 234, 235 and 236. Buffers 231, 233 and 235 receive output signals G1H, G2H and G3H from gates 241, 243 and 245 respectively. Buffers 232, 234 and 236 receive signals UL0, VL0 and WL0 from wide-angle feeding-signal generator 290 respectively. Each one of those buffers outputs a signal to respective gates of transistors 221, 222, 223, 224, 225 and 226.

Elements 220, 230, 240, 290, 101, 103 and 105 discussed above constitute wide-angle power feeding device 201. Elements 247, 250, 260, 270 and 280 discussed above constitute feeding amount controller 202.

An operation of the motor driving device in accordance with the second embodiment is demonstrated with reference to FIG. 4 through FIG. 7. FIG. 4 illustrates an operation of wide-angle feeding-signal generator 290. As shown in FIG. 4, generator 290 outputs signals UH0, UL0, VH0, VL0, WH0 and WL0, which stay on level "H" for 150 degrees electrical angle. These signals are produced based on position detecting signals Hu, Hv and Hw supplied from respective position detectors 101, 103 and 105.

In general, signals Hu, Hv and Hw have a phase difference in 120 degrees electrical angle from each other. Therefore, if these signals are theoretically compounded, it is impossible to generate signals which stay on level "H" for 150 degrees. However, for instance, measure one cycle of at least one of signals Hu, Hv and Hw (e.g. signal Hu), then divide the one cycle at intervals of every 15 degrees in electrical angles. If signal Hu undergoes these processes, signal Hc1 provided with such an electrical interpolation can be produced. Then signal Hc1 is utilized to produce signals UH0, UL0, VH0, VL0, WH0 and WL0 which stay on level H for 150 degrees electrical angle. FIG. 4 shows timing charts of this operation.

Not to mention, all the signals of Hu, Hv and Hw can be utilized and compounded, so that a composite signal having a higher frequency is obtained. One cycle of this signal can be used. However, when mechanical accuracy, whichever absolute or relative accuracy is, of mounting detectors 101, 103 and 105 is taken into consideration, it is more practical to use one signal out of three signals. One cycle is not always divided at intervals of every 15 degrees in electrical angles, it can be divided at smaller intervals. In this second embodiment, signal Hu is provided with electrical interpolation of division at intervals of every 15 degrees, thereby producing signal Hc1.

When motor 10 is driven by signals UH0, UL0, VH0, VL0, WH0 and WL0 produced according to the timing charts shown in FIG. 4, terminals U, V and W of respective phase-coils are fed with power in the following condition: (a) 120 degrees phase difference in electrical angles with each other; and (b) a cycle of feeding (applying a voltage) for 150 degrees and pause for 30 degrees.

When such feeding is carried out, overlapping periods, in which adjacent two phase-coils are in the same fed condition (both the adjacent phase-coils are fed in the positive feeding direction or in the negative feeding direction), are sequentially produced for 30 degrees electrical angle at intervals of 30 degrees phase-difference. As shown in FIG. 5, overlapping period detecting signal OL stays on level "H" during these overlapping periods.

In this second embodiment, while signal OL stays on level H, signal S supplied from speed setter 260 is multiplied by $\sin(\pi/3)$ (approx. 0.866) through the operation of level setter 270 and selector 280, and becomes first value L1, which is treated as signal L0. Signal L0 then undergoes PWM modulation based on value L1. Signal OL stays on level L during the periods other than the overlapping periods. During signal OL staying on level L, second value L2, which is signal S per se, is treated as signal L0 and undergoes PWM modulation based on value L2.

As a result, feeding power to each terminal U, V and W of respective phase-coils of motor 10 draws waveforms as shown in FIG. 6. During the overlapping periods, a little bit less power ($\sin(\pi/3)$, approx. 0.866) is fed than during non-overlapping periods in the 150 degrees feeding periods.

When coil terminals U, V and W are driven with such feeding waveforms, waveform (N) shown in FIG. 7 appears at neutral point N of respective phase-coils 11, 13 and 16. At this time, these respective phase-coils are fed according to voltage differences between neutral point N and respective coil terminals U, V and W. For instance, phase-U coil 11 is fed according to the waveform of signal U-N shown in FIG. 7.

This signal U-N takes the following values step by step, and these values are approximations and along a sine wave signal $\{(1/\sqrt{3})\sin\theta\}$, where $\theta=n\pi/6$, n=an integer. These values are as follows:

"$-(2/3)\sin(\pi/3)$", "$-(1/2)$", "$-(1/3)\sin(\pi/3)$", "0(no feeding)", "$(1/3)\sin(\pi/3)$", "$(1/2)$", and "$(2/3)\sin(\pi/3)$".

The reason why signal U-N takes these values step by step is that the selection out of first value L1 and second value L2, of which ratio is set at "$\sin(\pi/3):1$", is switched by overlapping period detecting signal OL, thereby feeding power to the respective phase-coils.

Similar operations are provided to phase-V coil 13 and phase-W coil 15. Although they are not shown in the drawings, signals V-N and W-N take values along sine wave signals and shape in step-like waveforms. When each phase coil is driven by such feeding waveforms, torque ripples can be suppressed to a low level as those by a sine-wave driving.

Wide-angle feeding-signal generator 290 produces feeding-waveform signals UH0, UL0, VH0, VL0, WH0 and WL0 by using signals Hu, Hv and Hw according to the timing chart shown in FIG. 4. Those signals UH0, UL0, VH0, VL0, WH0 and WL0 are supplied to power-feeder 220 via PWM modulator 240 and gate driver 230, thereby driving motor 10.

Based on the motor driving device that includes the foregoing wide-angle feeding-signal generator, the motor driving device in accordance with the second exemplary embodiment is demonstrated hereinafter.

FIG. 8 shows a circuit diagram of the motor driving device in accordance with the second embodiment of the present invention. The motor driving device in accordance with the second embodiment differs from that shown in FIG. 3 in two points, and one of them is a structure of the PWM modulator. PWM modulator 248 of the motor driving device in accordance with the second embodiment has the following structure:

PWM modulator 248 has AND gates 241, 243 and 245. PWM modulator 248 also has AND gates 242, 244 and 246 of one-sided inverter input. Respective first input terminals of gates 241, 243 and 245 receive signals UH0, VH0 and WH0. Respective second input terminals of gates 241, 243 and 245 are commonly connected with each other and also coupled to an output terminal of comparator 250. Respective first input terminals of gates 242, 244 and 246 receive signals UL0, VL0 and WL0. Respective second input terminals of gates 242, 244 and 246, i.e., inverter input terminals, are coupled to an output terminal of gates 241, 243 and 245 respectively.

Gate driver 230 has buffers 231, 232, 233, 234, 235 and 236. Buffers 231, 233 and 235 receive output signals G1H, G2H and G3H from gates 241, 243 and 245 respectively. Buffers 232, 234 and 236 receive signals G1L, G2L and G3L from gates 242, 244 and 246 respectively.

The other different point between the motor driving device in accordance with the second embodiment and that shown in FIG. 3 is the following point: Speed-detector 275 outputs signal OL1 to wide-angle feeding-signal generator 290. Detector 275 detects a speed of the motor in operation. Generator 290 can recognize the speed set at the threshold between the first feeding period and the second feeding period. Generator 290 outputs a different signal waveform in the first feeding period and in the second feeding period respectively. To be more specific, output signals UH0, UL0, VH0, VL0, WH0 and WL0 take the waveform shown in FIG. 9A during the first feeding period, and take the waveform shown in FIG. 9B during the second feeding period. Other structures remain unchanged from the circuit diagram shown in FIG. 3.

An operation of the foregoing motor driving device in accordance with the second exemplary embodiment is demonstrated hereinafter with reference to FIGS. 9A and 9B, which illustrate an operation of power feeder 200.

First, the timing chart shown in FIG. 9A shows a first feeding period, i.e., starting from the motor halt status and ending until the motor is driven at a given speed. In FIG. 9A, during the feeding period of 150 degrees in electrical angles, transistors 221, 222, 223, 224, 225 and 226 are turned on or turned off. In response to those ON or OFF, respective driving-coil terminals U, V and W are controlled to be either a power-supply voltage potential or the grounding potential.

To be more specific, when signal G1H stays on level "H", signal "g1h" which is formed by having signal G1H undergo buffer 231 also turns to level "H". At this time, signal G1L stays on level "L" and signal "g1L" which is formed by having signal G1L undergo buffer 232 also turns to level "L". In this status, transistor 221 is turned on and transistor 222 is turned off, so that terminal U of driving coil has a potential substantially equal to that of power-supply voltage Vdc. In actual, driving-coil terminal U has a potential of power-supply voltage Vdc minus a voltage-drop amount corresponding to on-voltage between the source and the drain of transistor 221. This on-voltage between source and drain is negligibly small with respect to power-supply voltage Vdc. The foregoing operation can be also applied to driving-coil terminals V and W. Therefore, in the claim discussed later, the following expression is used: "electrical potentials of respective coils are set equal to the power-supply voltage potential."

On the contrary, when signal G1H stays on level "L", signal "g1h" which is formed by having signal G1H undergo buffer 231 also turns to level "L". At this moment, signal G1L stays on level "H", and signal g1L which is formed by having signal G1L undergo buffer 232 also turns to level "H". In this status, transistor 221 is turned off and transistor 222 is turned on, so that driving-coil terminal U has a potential substantially equal to the grounding potential. In actual, driving-coil terminal U has a potential of power-supply voltage Vdc plus an amount of on-voltage between the source and the drain of transistor 222. This on-voltage between source and drain is negligible small with respect to power-supply voltage Vdc. The foregoing operation can be also applied to driving-coil terminals V and W. Therefore, in the claim discussed later, the following expression is used: "electrical potentials of respective coil terminals are set equal to the grounding potential."

In a similar manner, when signal G2H stays on level "H", signal "g2h" which is formed by having signal G2H undergo buffer 233 also turns to level "H". At this time, signal G2L stays on level "L" and signal "g2L" which is formed by having signal G2L undergo buffer 234 also turns to level "L". In this status, transistor 223 is turned on and transistor 224 is turned off, so that terminal V of driving coil has a potential substantially equal to power-supply voltage Vdc. On the contrary, when signal G2H stays on level "L", signal "g2h" which is formed by having signal G2H undergo buffer 233 also turns to level "L". At this moment, signal G2L stays on level "H", and signal g2L which is formed by having signal G2L undergo buffer 234 also turns to level "H". In this status, transistor 223 is turned off and transistor 224 is turned on, so that driving-coil terminal V has a potential substantially equal to the grounding potential.

In a similar manner, when signal G3H stays on level "H", signal "g3h" which is formed by having signal G3H undergo buffer 235 also turns to level "H". At this time, signal G3L stays on level "L" and signal "g3L" which is formed by having signal G3L undergo buffer 236 also turns to level "L". In this status, transistor 225 is turned on and transistor 226 is turned off, so that terminal W of driving coil has a potential substantially equal to that of power-supply voltage Vdc. On the contrary, when signal G3H stays on level "L", signal "g3h" which is formed by having signal G3H undergo buffer 235 also turns to level "L". At this moment, signal G3L stays on level "H", and signal g3L which is formed by having signal G3L undergo buffer 236 also turns to level "H". In this status, transistor 225 is turned off and transistor 226 is turned on, so that driving-coil terminal W has a potential substantially equal to the grounding potential.

As discussed above, while outputs from buffers 231, 233 and 235 keep changing level "H" and level "L", buffers 232, 234 and 236 keep outputting level "L" and level "H" alternately in sequence corresponding to the outputs from buffers 231, 233 and 235. Transistors 222, 224 and 226 are thus turned on at regular intervals, so that terminals s1h, s2h and s3h become the grounding potential regularly. As a result, the function of buffers is kept retaining.

Next, during the second feeding period, i.e., the motor is driven at a speed over the given speed, feeding controller 200 controls power-feeding to three-phase driving-coil terminals U, V and W of motor 10 as shown in FIG. 9B. Signals G1H, G1L, G2H, G2L, G3H, G3L are supplied to corresponding transistors 221, 222, 223, 224, 225 and 226 via corresponding buffers 231, 232, 233, 234, 235, 236. During the feeding period of 150 degrees in electrical angle, transistors 221, 223, 225 are turned on or off and transistors 222, 224, 226 are turned off. Terminals U, V, W of respective driving coils are controlled such that their potentials become the power-supply voltage potential, or the terminals are opened.

To be more specific, when signal G1H stays on level "H", signal "g1h" which is formed by having signal G1H undergo buffer 231 also turns to level "H". At this time, signal G1L stays on level "L" and signal "g1L" which is formed by having signal G1L undergo buffer 232 also turns to level "L". In this status, transistor 221 is turned on and transistor 222 is turned off, so that terminal U of driving coil has a potential substantially equal to that of power-supply voltage Vdc. On the other hand, when signal G1H stays on level "L", signal "g1h" which is formed by having signal G1H undergo buffer 231 also turns to level "L". At this moment, signal G1L keeps staying on level "L", and signal g1L which is formed by having signal G1L undergo buffer 232 also keeps staying on level "L". In this status, transistors 221 and 222 are turned off, so that driving-coil terminal U is opened.

In a similar manner, when signal G2H stays on level "H", signal "g2h" which is formed by having signal G2H undergo buffer 233 also turns to level "H". At this time, signal G2L stays on level "L" and signal "g2L" which is formed by having signal G2L undergo buffer 234 also turns to level "L". In this status, transistor 223 is turned on and transistor 224 is turned off, so that terminal V of driving coil has a potential substantially equal to that of power-supply voltage Vdc. On the other hand, when signal G2H stays on level "L", signal "g2h" which is formed by having signal G2H undergo buffer 233 also turns to level "L". At this moment, signal G2L keeps staying on level "L", and signal g2L which is formed by having signal G2L undergo buffer 234 also keeps staying on level "H". In this status, transistors 223 and 224 are turned off, so that driving-coil terminal V is opened.

In a similar manner, when signal G3H stays on level "H", signal "g3h" which is formed by having signal G3H undergo buffer 235 also turns to level "H". At this time, signal G3L stays on level "L" and signal "g3L" which is formed by having signal G3L undergo buffer 236 also turns to level "L". In this status, transistor 225 is turned on and transistor 226 is turned off, so that terminal W of driving coil has a potential substantially equal to that of power-supply voltage Vdc. On the other hand, when signal G3H stays on level "L", signal "g3h" which is formed by having signal G3H undergo buffer 235 also turns to level "L". At this moment, signal G3L keeps staying on level "L", and signal g3L which is formed by having signal G3L undergo buffer 236 also keeps staying on level "L". In this status, transistors 225 and 226 are turned off, so that driving-coil terminal W is opened.

In FIGS. 9A and 9B, x-axis represents electrical angles, so that a feeding period in a feeding cycle of 150 degrees in the first feeding period is equal to that in the second feeding period; however, the second feeding period has a higher speed than in the first feeding period. The feeding period of 150 degrees in the second period is thus shorter than that in the first period timewise. Therefore, in the second feeding period, the buffer function can be maintained by on-signals G1L, G2L and G3L of the transistors at the intervals as shown in FIG. 9. It is not needed to have terminals s1h, s2h and s3h be equal compulsorily to the grounding potential as a conventional device did. Because the current running through the driving coils causes three-phase driving coils U, V and W to have the grounding potential, so that terminals s1h, s2h and s3h also have the grounding potential. As a result, the buffers can retain their functions. This mechanism is similar to that of the first embodiment.

In the second feeding period, even if the motor reduces its speed, the motor does not fall into a brake status and the speed will not decrease rapidly, because three-phase driving coils U, V and W are not coupled to each other via transistors as the conventional device did. As a result, the motor operates advantageously at a lower noise and with less vibrations.

A variety of signal processing done in this first embodiment can be achieved by hardware such as an analog circuit or a digital circuit, or by software using a microprocessor or a digital signal processor. Not to mention, the signal processing can be also achieved in the form of IC or LSI.

The motor of the present invention is driven by a motor driving device, and the motor driving device in accordance with the second exemplary embodiment discussed above can be used for this motor driving device. Use of the motor driving device allows the motor of the present invention to operate advantageously at a lower noise and with less vibrations. The apparatus of the present invention employs a motor driven by a motor driving device. The motor driving device in accordance with the second embodiment of the present invention can be used as this motor driving device. Use of the motor driving device allows the apparatus of the present invention to operate advantageously at a lower noise and with less vibrations.

As discussed above, the first embodiment describes the case where rectangular feeding waveforms of 120 degrees in electrical angles are used in the first and second feeding periods, and the second embodiment describes the case where wide-angle feeding waveforms of 150 degrees in electrical angles are used in the first and second feeding periods. Further, a similar advantage to that of the first and second embodiments can be achieved by a feeding angle ranging from 120 to 180 degrees in electrical angles in a voltage-applied-waveform during the first and second feeding periods.

The second embodiment describes the case where wide-angle feeding waveforms are used both in the first and second feeding periods; however, a similar advantage may be gained if the wide-angle feeding waveforms are used in either one of the first or second feeding period and feeding waveforms of 120 degrees in electrical angles are used in the remaining feeding period. For instance, the motor driving device of the present invention, to be driven by rectangular waveforms of 120 degrees during the first feeding period and by wide-angle feeding waveforms of 150 degrees during the second feeding period, can be one of the preferred embodiments suitable for practical use, if all things such as noises, vibrations and efficiency of the motor are considered.

Exemplary Embodiment 3

FIG. 10A through FIG. 16 illustrate structures of the apparatuses in accordance with the third exemplary embodiment of the present invention.

Figure 10A:
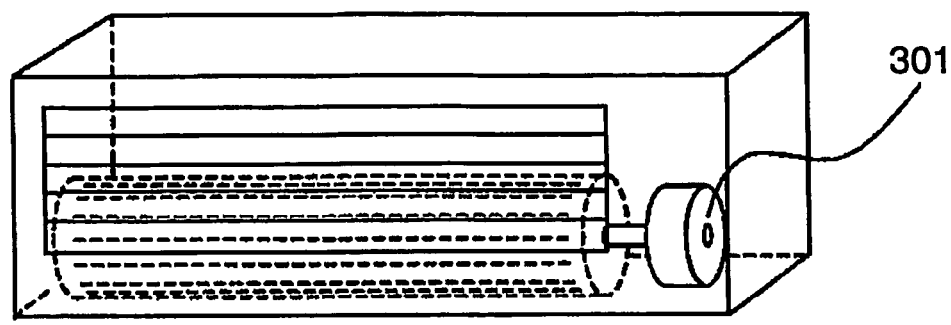
FIG. 10A and FIG. 10B illustrates a structure of an apparatus (air-conditioner) in accordance with a third exemplary embodiment of the present invention.
Figure 10B:
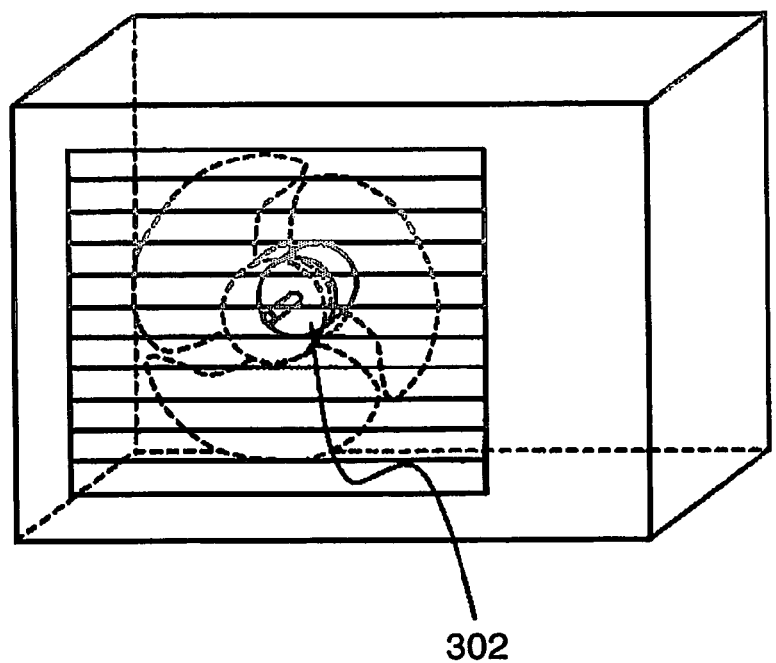

FIGS. 10A and 10B illustrate a structure of an air-conditioner. FIG. 10A shows a schematic diagram of an indoor unit of the air-conditioner. The indoor unit includes motor 301 which spins a cross-flow fan to be used for blowing. Motor 301 has a structure to be driven by the motor driving device in accordance with the first or second embodiment, so that the indoor unit of the air-conditioner operates at a lower noise and with less vibrations.

FIG. 10B shows a schematic diagram of an outdoor unit of the air-conditioner, and the outdoor unit includes motor 302 which spins a blowing fan. Motor 302 has a structure to be driven by the motor driving device in accordance with the first or second embodiment, so that the outdoor unit of the air-conditioner operates at a lower noise and with less vibrations.

Figure 11:
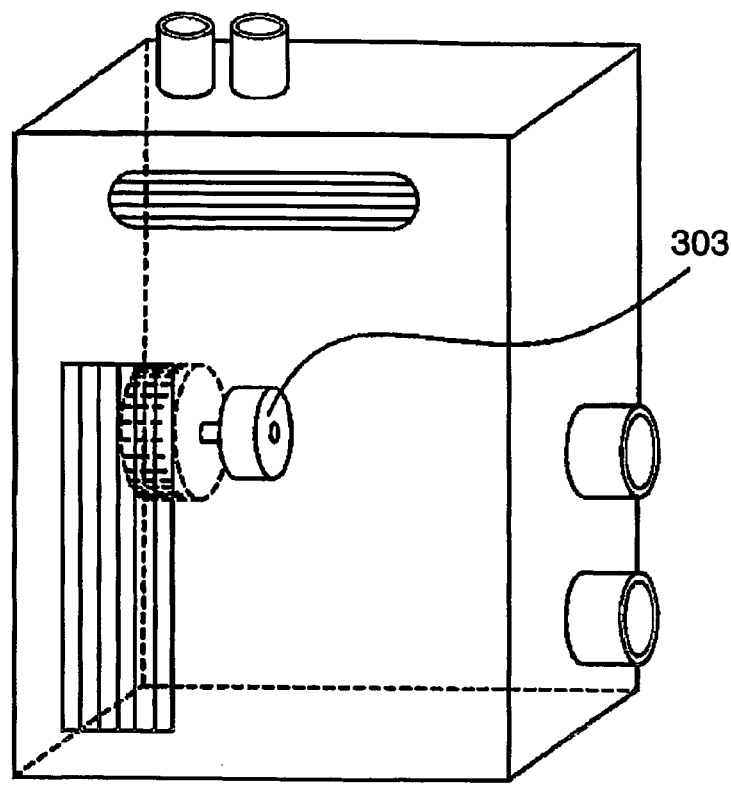
FIG. 11 illustrates a structure of an apparatus (hot-water supply) in accordance with the third exemplary embodiment of the present invention.

FIG. 11 shows a structure of a hot-water supply including motor 303 which spins a fan for blowing the air necessary for burning. Motor 303 has a structure to be driven by the motor driving device in accordance with the first or second embodiment, so that the hot-water supply operates at a lower noise and with less vibrations.

Figure 12:
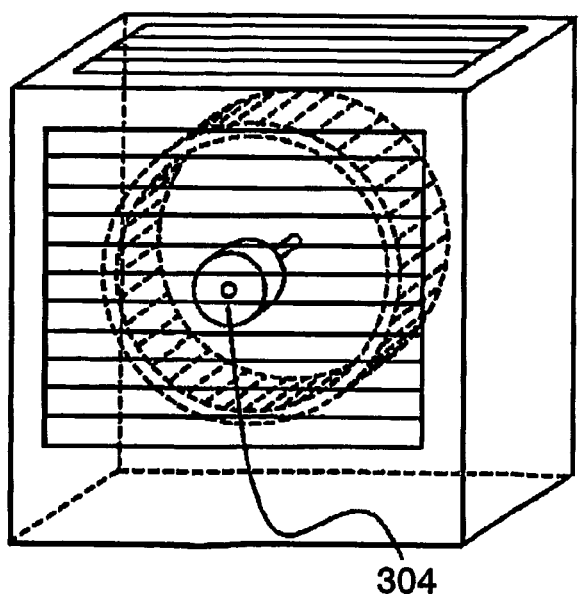
FIG. 12 illustrates a structure of an apparatus (air cleaner) in accordance with the third exemplary embodiment of the present invention.

FIG. 12 show a structure of an air cleaner including motor 304 for spinning a air-circulating fan. Motor 304 has a structure to be driven by the motor driving device in accordance with the first or second embodiment, so that the air cleaner operates at a lower noise and with less vibrations.

Figure 13:
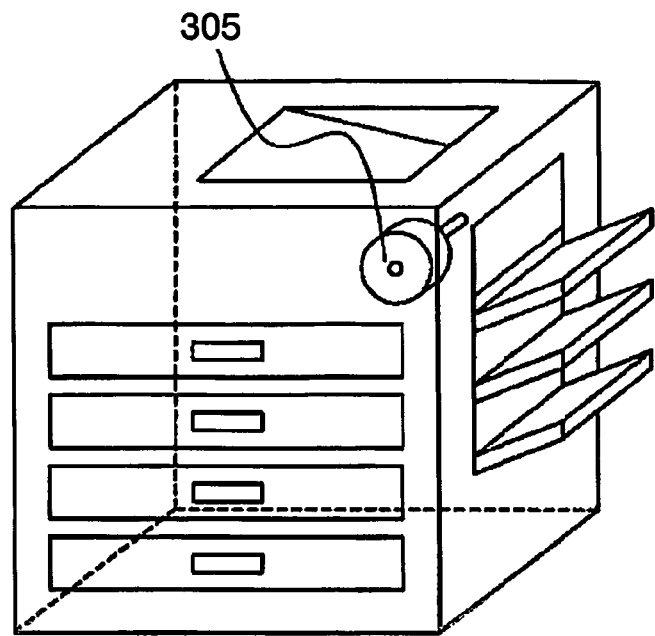
FIG. 13 illustrates a structure of an apparatus (printer) in accordance with the third exemplary embodiment of the present invention.

FIG. 13 shows a structure of a printer including motor 305 for feeding a sheet of paper. Motor 305 has a structure to be driven by the motor driving device in accordance with the first or second embodiment, so that the printer operates at a lower noise and with less vibrations.

Figure 14:
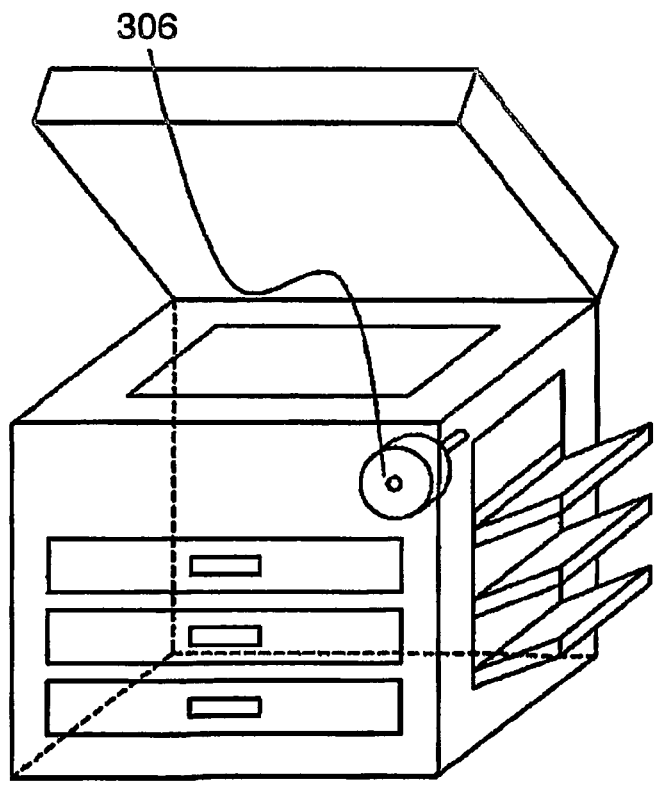
FIG. 14 illustrates a structure of an apparatus (copy machine) in accordance with the third exemplary embodiment of the present invention.

FIG. 14 shows a structure of a copying machine including motor 306 for feeding a sheet of paper. Motor 306 has a structure to be driven by the motor driving device in accordance with the first or second embodiment, so that the copying machine operates at a lower noise and with less vibrations.

Figure 15:
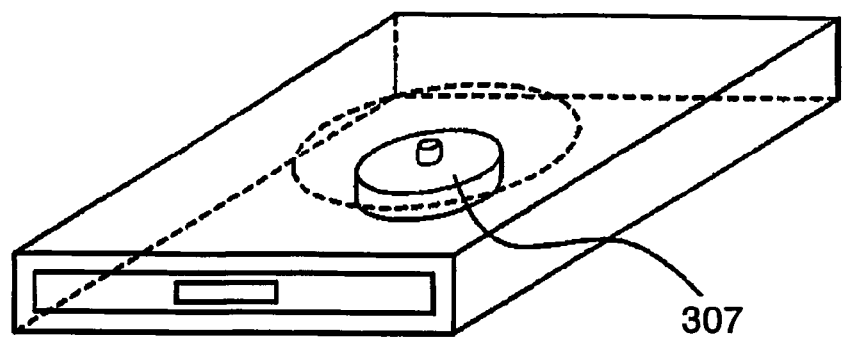
FIG. 15 illustrates a structure of an apparatus (optical medium apparatus) in accordance with the third exemplary embodiment of the present invention.

FIG. 15 shows a structure of an optical medium apparatus such as a compact disc driving apparatus including spindle motor 307 for spinning an optical disc. Motor 307 has a structure to be driven by the motor driving device in accordance with the first or second embodiment, so that the optical medium apparatus operates at a lower noise and with less vibrations.

Figure 16:
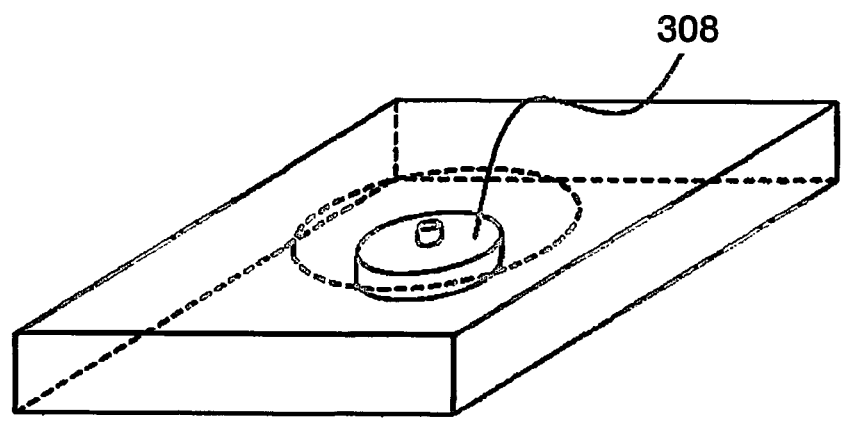
FIG. 16 illustrates a structure of an apparatus (hard-disc apparatus) in accordance with the third exemplary embodiment of the present invention.
Figure 17:
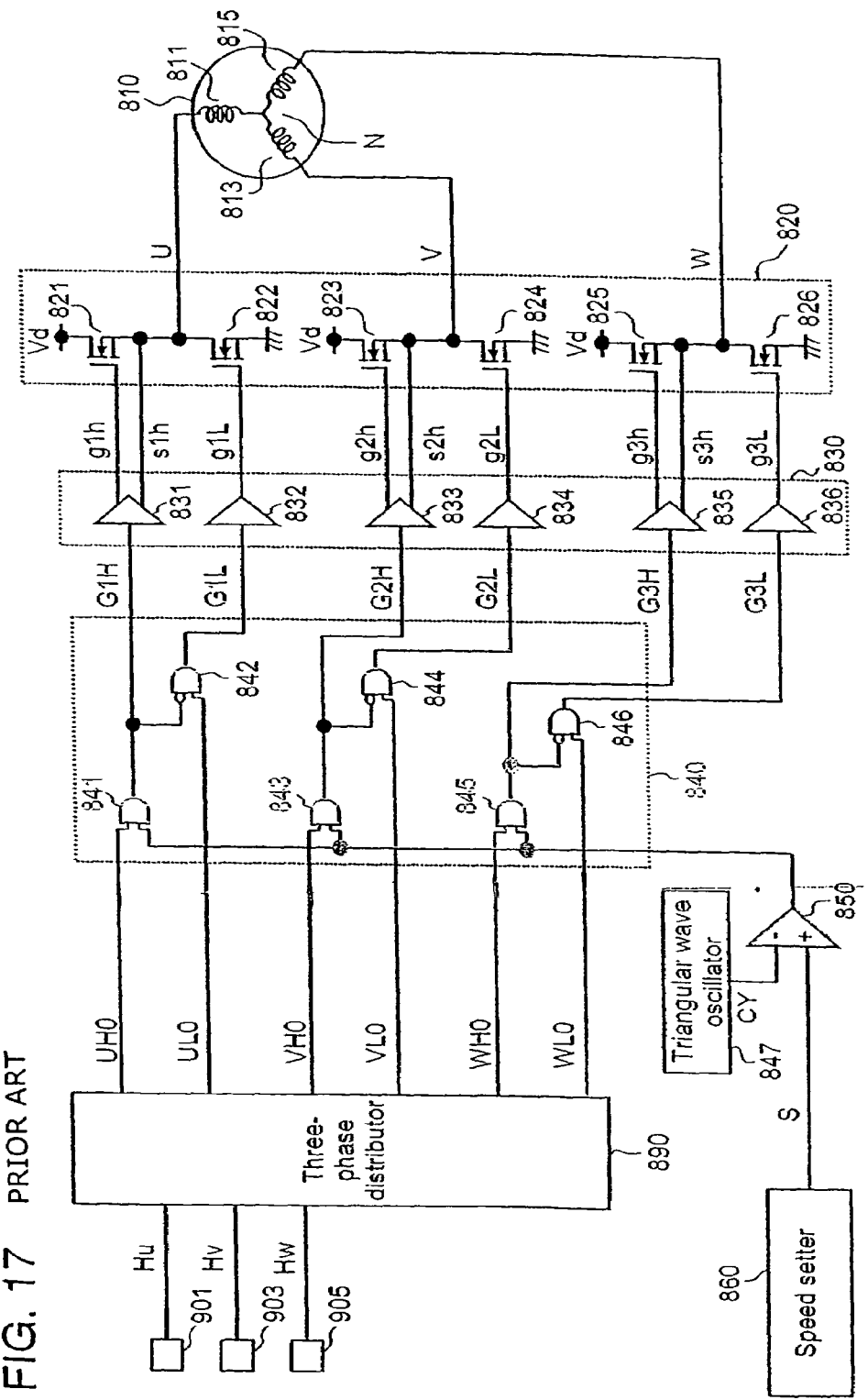
FIG. 17 shows a circuit diagram of a conventional motor driving device.
Figure 18:
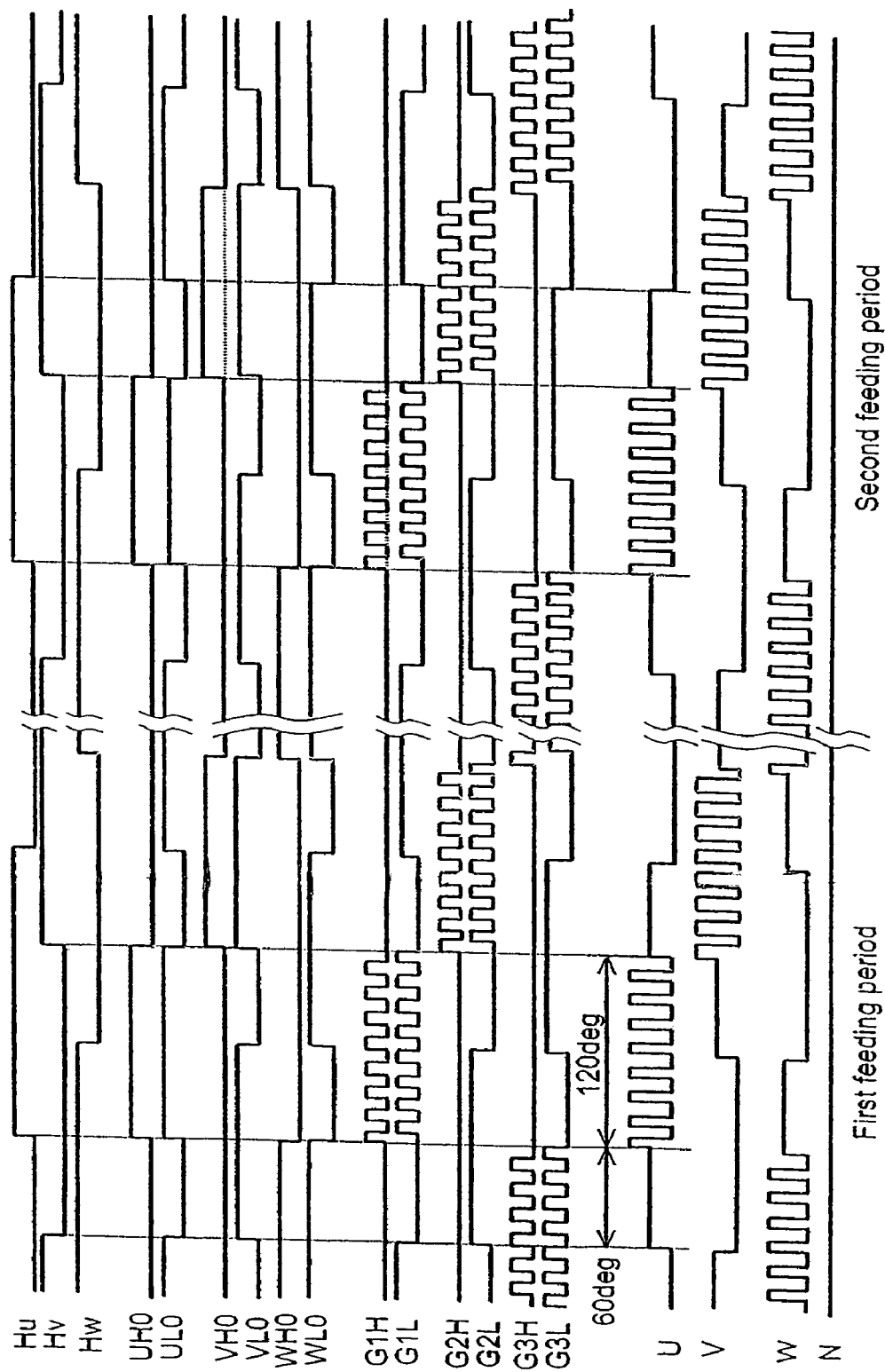
FIG. 18 illustrates an operation of the driving device shown in FIG. 17.

FIG. 16 shows a structure of a hard disc apparatus including spindle motor 308 for spinning a hard disc. Motor 308 has a structure to be driven by the motor driving device in accordance with the first or second embodiment, so that the hard disc driving apparatus operates at a lower noise and with less vibrations.

As discussed above, the present invention allows the motor to operate at a lower noise and with less vibrations, and when the speed is reduced, the present invention allows suppressing substantially the factors of noises and vibrations, so that the motor is prevented from sudden reduction of the speed. The motor driving device achieving the foregoing advantages can be mounted to various apparatuses, thereby making the apparatuses operate at a lower noise and with less vibrations.

Industrial Applicability

The present invention discloses a simply-structured motor driving device that operates a motor at a lower noise and with less vibrations. The present invention addresses a motor to be driven by the motor driving device of the present invention, so that the motor can operate at a lower noise and with less vibrations. The present invention also addresses an apparatus which includes the motor to be driven by the motor driving device of the present invention, so that the motor driving device is applicable to various apparatuses, so that those apparatuses operate at a lower noise and with less vibrations.

The invention claimed is:

1. A motor driving device comprising:
   (a) a motor including three-phase driving coils;
   (b) a power feeder for feeding power to said driving coils, the power feeder including an upper arm transistor and a lower arm transistor corresponding to each of the respective coils; and
   (c) a power feeding controller for controlling a method of feeding power by said power feeder to said driving coils during a first feeding period and during a second feeding period,
   wherein said first feeding period corresponds to driving the motor from a motor halt status up to and including a predetermined speed and said second feeding period corresponds to driving the motor above the predetermined speed,
   during said first feeding period, said power feeder controller controls electrical potentials of a respective coils during its respective driving period by a pulse width modulation (PWM) function by applying a voltage to said coils, such that the voltage applied to said coil equals alternately to one of a power supply voltage potential or a grounding potential by cycling between 1) turning on the upper arm transistor and turning off the lower arm transistor, and 2) turning off the upper arm transistor and turning on the lower arm transistor, cycling between 1) and 2) the first PWM function while one or the lower arm transistors is turned on, and
   during said second feeding period, said power feeder controller controls the electrical potentials of the said coil during its respective driving period by a second PWM function such that the voltage is applied to said coil is equal alternately to one of a power supply voltage potential and an open circuit applying the voltage to said driving coils, such by cycling between 1) turning on the upper arm transistor and 2) turning off the upper arm transistor to the driven coil, but turning off and leaving off the respective lower arm transistor to the driven coil, cycling through 1) and 2) of the second PWM while one of the lower arm transistors of a coil different from the driven coil is turned on, wherein the transistor switching is performed without coupling the coils to each other via the upper arm transistor or the lower arm transistor.

2. The motor driving device of claim 1, wherein a power feeding angle used in at least one of the first feeding period and the second feeding period falls within not less than 120 degrees and not more than 180 degrees in electrical angles.

3. The motor driving device of claim 1 further comprising a wide-angle power feeding device for feeding power to said driving coils in a feeding period of 150 degrees in electrical angles, wherein said wide-angle power feeding device detects an overlapping period where adjacent driving coils out of said driving coils fall in an identical fed status, and wherein said power feeder feeds a first amount to said driving coils during the overlapping period and feeds a second amount to said driving coils during a period other than the overlapping period.

4. The motor driving device of claim 3, wherein a ratio of the first amount vs. the second amount is $\sin(\pi/3) : 1$.

* * * * *

UNITED STATES PATENT AND TRADEMARK OFFICE
CERTIFICATE OF CORRECTION

| | |
|---|---|
| PATENT NO. | : 7,218,072 B2 |
| APPLICATION NO. | : 10/542484 |
| DATED | : May 15, 2007 |
| INVENTOR(S) | : Kenji Sugiura et al. |

Page 1 of 1

It is certified that error appears in the above-identified patent and that said Letters Patent is hereby corrected as shown below:

<u>Column 17</u>

Claim 1
Line 22, "coils" should read -- coil --.

Claim 1
Line 25, "coils" should read -- coil --.

Signed and Sealed this

Twenty-eighth Day of August, 2007

JON W. DUDAS
*Director of the United States Patent and Trademark Office*